US012316939B2

(12) United States Patent
Galindo et al.

(10) Patent No.: US 12,316,939 B2
(45) Date of Patent: May 27, 2025

(54) CAMERA LENS SYSTEM FILTER

(71) Applicant: Panavision International, L.P., Woodland Hills, CA (US)

(72) Inventors: Edwin Iovanni Galindo, West Hills, CA (US); Charles P. Hagmaier, Jr., Arroyo Grande, CA (US); Daniel Keith Sasaki, Glendale, CA (US); Guy Hamilton McVicker, Simi Valley, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 17/537,456

(22) Filed: Nov. 29, 2021

(65) Prior Publication Data
US 2022/0166906 A1 May 26, 2022

Related U.S. Application Data

(63) Continuation-in-part of application No. 17/534,318, filed on Nov. 23, 2021, which is a continuation of
(Continued)

(51) Int. Cl.
*H04N 23/55* (2023.01)
*G02B 5/20* (2006.01)
(Continued)

(52) U.S. Cl.
CPC ............ *H04N 23/55* (2023.01); *G02B 5/20* (2013.01); *G03B 11/00* (2013.01); *G09G 3/3208* (2013.01); *H04N 23/56* (2023.01)

(58) Field of Classification Search
None
See application file for complete search history.

(56) References Cited

U.S. PATENT DOCUMENTS 5,172,146 A * 12/1992 Wooldridge ........... G03B 11/00
396/233
5,953,546 A 9/1999 Okada et al.
(Continued)

FOREIGN PATENT DOCUMENTS

CN 101044622 A 9/2007
CN 102034230 A 4/2011
(Continued)

OTHER PUBLICATIONS

International Search Report dated Jul. 22, 2019 in corresponding International Application No. PCT/US 2019/027387 filed Apr. 12, 2019; total 4 pages.
(Continued)

*Primary Examiner* — Quan Pham
(74) *Attorney, Agent, or Firm* — Snell & Wilmer L.L.P.

(57) ABSTRACT

Electronic camera filters comprise an electronic display configured for use with a camera system to provide different levels of image filtering, as a neutral density filter, for passage to a camera. The electronic display is programmable so that it may be calibrated to provide different desired filter levels associated with different settings of a camera lens iris, focus, zoom, or light meter measurement. The electronic display may be calibrated manually or by calibration information stored or otherwise downloaded into electronic display memory. The ability to program and calibrate the filter level setting enables the electronic display to be operated in synchrony with the camera lens iris, focus, zoom, or light meter it is calibrated with to provide a desired combined or synergistic optical characteristic. The electronic display may be controlled to provide synchronized operation by the same controller used to control the camera lens iris, focus, and/or or zoom.

28 Claims, 15 Drawing Sheets

Related U.S. Application Data application No. 16/381,433, filed on Apr. 11, 2019, now Pat. No. 11,184,510.

(60) Provisional application No. 62/657,574, filed on Apr. 13, 2018.

(51) Int. Cl.
    *G03B 11/00*     (2021.01)
    *G09G 3/3208*     (2016.01)
    *H04N 23/56*     (2023.01)

(56) References Cited

U.S. PATENT DOCUMENTS

| | | | |
|---|---|---|---|
| 2002/0071185 | A1 | 6/2002 | Chretien et al. |
| 2008/0007645 | A1 | 1/2008 | McCutchen |
| 2008/0123097 | A1 | 5/2008 | Muhammed et al. |
| 2009/0196592 | A1* | 8/2009 | Nojima ............... H04N 23/667 348/E5.042 |
| 2012/0176659 | A1 | 7/2012 | Hsieh et al. |
| 2014/0063049 | A1 | 3/2014 | Armstrong-Muntner |
| 2014/0104449 | A1 | 4/2014 | Masarik et al. |
| 2014/0300805 | A1* | 10/2014 | Davis .................... H04N 23/55 348/362 |
| 2015/0181098 | A1 | 6/2015 | Davis et al. |
| 2017/0140558 | A1 | 5/2017 | Lee |
| 2017/0252215 | A1* | 9/2017 | Wu ........................ A61F 9/065 |
| 2017/0295307 | A1 | 10/2017 | Ito |
| 2017/0359495 | A1 | 12/2017 | Hawes et al. |
| 2018/0096642 | A1 | 4/2018 | Vishakantaiah et al. |
| 2019/0045144 | A1 | 2/2019 | Reed et al. |

FOREIGN PATENT DOCUMENTS

| | | | |
|---|---|---|---|
| CN | 104076576 | A | 10/2014 |
| EP | 2648086 | A2 | 10/2013 |
| GB | 2534577 | A | 8/2016 |
| JP | 2008072337 | A | 3/2008 |
| JP | 2013024897 | A | 2/2013 |
| JP | 2013165432 | A | 8/2013 |
| KR | 20140144455 | A * | 12/2014 |
| TW | 200919210 | A | 5/2009 |
| WO | 2012037201 | A2 | 3/2012 |
| WO | 2019200358 | A1 | 10/2019 |

OTHER PUBLICATIONS

Written Opinion of the International Searching Authority dated Jul. 22, 2019 in corresponding International Application No. PCT/US 2019/027387 filed Apr. 12, 2019; total 8 pages.

International Preliminary Report on Patentability dated Oct. 13, 2020 in corresponding International Application No. PCT/US 2019/027387 filed Apr. 12, 2019; total 9 pages.

Wikipedia contributors. "See-through display." Wikipedia, The Free Encyclopedia. Wikipedia, The Free Encyclopedia, Sep. 23, 2017. Web. Aug. 21, 2019. Retrieved from https://en.wikipedia.org/w/index.php?title=See-through_display&oldid=802069921; total 3 pages.

Non-Final Office Action dated Jun. 5, 2020 in corresponding U.S. Appl. No. 16/381,433, filed Apr. 11, 2019; total 50 pages.

Final Office Action dated Dec. 22, 2020 in corresponding U.S. Appl. No. 16/381,433, filed Apr. 11, 2019; total 28 pages.

Non-Final Office Action dated Apr. 1, 2021 in corresponding U.S. Appl. No. 16/381,433, filed Apr. 11, 2019; total 25 pages.

Notice of Allowance dated Jul. 22, 2021 in corresponding U.S. Appl. No. 16/381,433, filed Apr. 11, 2019; total 10 pages.

Non-Final Office Action dated Oct. 14, 2022 in corresponding U.S. Appl. No. 17/534,318 filed Nov. 23, 2021; total pp. 18 pages. .

Final Office Action dated May 8, 2023 in corresponding U.S. Appl. No. 17/534,318 filed Nov. 23, 2021; total pp. 27 pages.

Non-Final Office Action dated Aug. 22, 2023 in corresponding U.S. Appl. No. 17/534,318 filed Nov. 23, 2021; total pp. 17 pages.

Written Opinion of the International Searching Authority dated Apr. 12, 2023 in corresponding International Application No. PCT/US2022/051102 filed Nov. 28, 2022; total 4 pages.

International Search Report dated Apr. 12, 2023 in corresponding International Application No. PCT/US2022/051102 filed Nov. 28, 2022; total 4 pages.

Final Office Action dated Apr. 24, 2024 for corresponding U.S. Appl. No. 17/534,318 filed Nov. 23, 2021; total pp. 16 pages.

International Preliminary Report on Patentability dated May 2, 2024 for corresponding International Application No. PCT/US2022/051102 filed Nov. 28, 2022; total 5 pages.

Applicant-Initiated Interview Summary dated Mar. 23, 2021 for corresponding U.S. Appl. No. 16/381,433 filed Apr. 11, 2019; total 10 pages.

Applicant-Initiated Interview Summary dated Jul. 6, 2021 for corresponding U.S. Appl. No. 16/381,433 filed Apr. 11, 2019; total 13 pages.

Non-Final Office Action dated Oct. 10, 2024 for corresponding U.S. Appl. No. 17/538,318, filed Nov. 23, 2021; total 15 pages.

\* cited by examiner

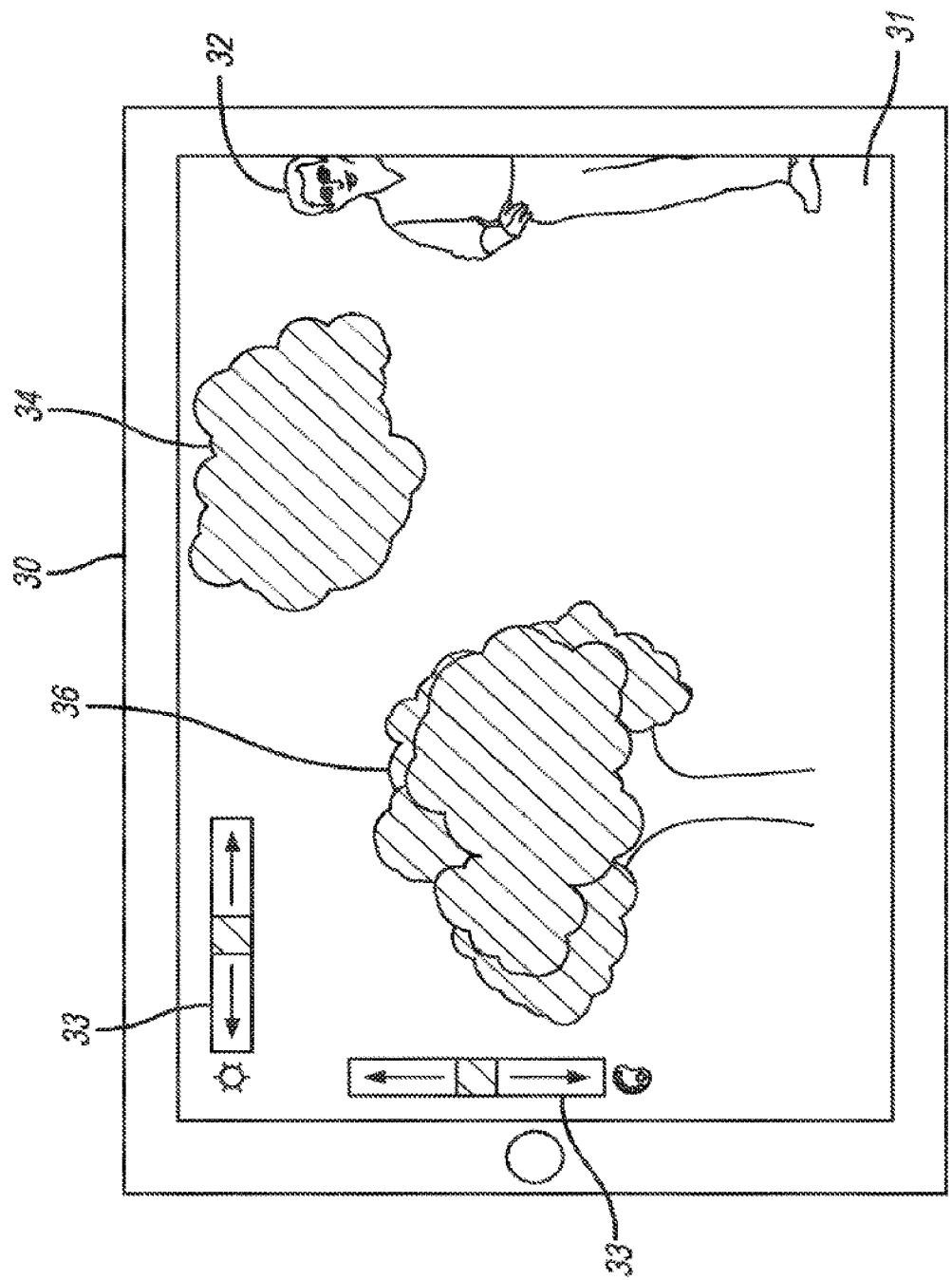

CAMERA LENS SYSTEM FILTER

CROSS-REFERENCE TO RELATED APPLICATIONS

This patent application is a continuation-in part of U.S. patent application Ser. No. 17,534,318 filed Nov. 23, 2021, which is a continuation of U.S. patent application Ser. No. 16/381,433 filed Apr. 11, 2019, now U.S. Pat. No. 11,184,510, which claims the benefit of U.S. Provisional Application No. 62/657,574 filed Apr. 13, 2018, which patent applications are hereby incorporated by reference in their entirety.

BACKGROUND

Filters for cameras are used to reduce the amount of light coming into the camera or to produce other optical effects (e.g., varying the color of an image). These filters need to be interchanged manually to vary the optical effect produced by the filters. In movie productions, the manual interchange of filters cannot occur during the shot. In addition, the time and effort taken to swap out filters in between shots can increase the cost of movie production. For example, if a camera is located in a high crane, the crane will need to be lowered for the filter to be manually swapped out.

Additionally, in movie production the level or amount of filtering that may be desired for a particular shot may change depending on the particular setting of the camera or lens, which setting may include and not be limited to the setting of the camera lens aperture or iris, the setting of the camera lens zoom, the setting of the camera lens focus, and/or the lighting around the camera or the object being filmed. Accordingly, the changings of these settings often causes a user to change filters to address changes in such settings.

There is accordingly a need for a more efficient manner to vary filtering for cameras, without needing to manually swap out filters. Additionally, there is a need to a more efficient manner to vary the level of filtering for cameras without needing to manually swap out filters to thereby enable changes in filtering based on changes made to one or more camera system or camera lens settings during use.

SUMMARY

The present disclosure addresses the above needs by providing an electronic display that is configured to be matched, paired, or calibrated with a camera system, or camera lens, or an object ancillary to the camera such as a light meter, e.g., when functioning as a neutral density filter, to provide such calibrated filter levels as changes are made to the camera system, lens system, or object ancillary to the camera, to thereby provide synchronized operation between the electronic display and the camera system, lens system, or ancillary object.

In an example, the electronic display as disclosed herein is configured for attachment with a camera lens system and is configured to filter an image passing to a camera. In an example, the filter is attached to an object side of the camera lens system. In an example, the filter is interposed between a camera and the camera lens system, or may be interposed between different elements of a camera lens system, or may be interposed within a camera. In an example, the filter may be to couple to a camera system between a camera lens and an image receiver of the camera system. In an example, the electronic display comprises filter level settings that are calibrated by user programming or the like to at least one of iris T-stop settings of the camera lens, focus settings of the camera lens, zoom settings of the camera lens, and light exposure measurements of a light meter. In an example, the electronic display comprises a controller configured to electrically control the filtering of the electronic display. The electronic display also comprises a receiving means for receiving a control signal for controlling the controller. In an example, the receiving means comprises a wireless signal receiver. In an example, the receiving means comprises a serial input port for receiving a control signal by a cabled connect therewith.

In an example, the electronic display is configured to operate in synchrony with the operation of at least one of the camera lens iris, the camera lens focus, the camera lens zoom, and the light meter to change filter settings to the calibrated settings based on at least one of different iris T-stop settings, different focus settings, different zoom settings, and different light exposure measurements according to the respective calibrated filter settings. Configured in this manner, once the electronic display filter levels are calibrated to the different camera lens element or object settings, the electronic display and camera lens element or object may be operated in synchrony with the electronic display providing the calibrated filter level matched to the different camera lens element or object settings.

In an example, the electronic display comprises liquid-crystals therein for filtering the image. In such example, the electronic display is a neutral density filter, and the filter settings being calibrated are different neutral density levels. In an example, the electronic display includes one or more organic light-emitting diodes therein for filtering the image. In an example, the electronic display comprises a housing that is coupled thereto, and the controller and the receiving means are positioned within the housing. In an example, the housing comprises at least a portion of a frame for the electronic display. In an example, the electronic display is configured to removably couple to a matte box for coupling to the camera lens. Alternatively, the electronic display may comprise a housing configured to enable coupling or fitment between different camera lens elements or sections, between the camera lens and the camera, e.g., behind the lens, or within/inside the camera.

In an example, the electronic display filter settings are calibrated to the camera lens iris T-stop settings, and the electronic display operates in synchrony with the camera lens iris. In an example, the electronic display filter settings are calibrated to the camera lens focus settings, and the electronic display operates in synchrony with the camera lens focus. In an example, the electronic display filter settings are calibrated to the camera lens zoom settings, and the electronic display operates in synchrony with the camera lens zoom. In an example, the electronic display filter settings are calibrated to the camera lens iris settings, the electronic display is synchronized to operate with the camera lens iris, and the camera lens iris is operated in synchrony with the camera lens focus. In an example, the electronic display may be calibrated with any one of the iris, the focus, and the zoom, and operate in synchrony with the iris, the focus, and the zoom it is calibrate with, while one or more of the other of the iris, focus, and zoom not calibrate with the electronic display may operate in synchrony with the calibrated lens element. In an example, the electronic display filter settings are calibrated to the light exposure measurements of the light meter, and the electronic display operates in synchrony with the light meter.

In an example, the electronic display includes a first portion and a second portion, the first portion and second portion both configured to allow light to pass therethrough, and the controller is configured to electrically control the filtering of the electronic display such that the first portion filters the image at the same time the second portion does not filter the image. In an example, the controller is configured to electrically control the filtering of the electronic display such that the second portion filters the image at the same time the first portion does not filter the image.

In an example, the electronic display filters light of an image for a camera system by calibrating filter settings of the electronic display with at least one of iris T-stop settings of the camera lens, focus settings of the camera lens, zoom settings of the camera lens, and light exposure measurements of a light meter. In an example, the electronic display comprises liquid crystals that are electronically controlled to filter light enabling the electronic display to function as a variable neutral density filter. In an example, the calibrating step may be carried out through the use of user inputs on the electronic display or by preprogramed calibration settings that are stored in a memory of the electronic display or downloaded into the memory of the electronic display. In an example, the electronic display device may comprise preset filter levels that are calibrated to, or may comprise a range of unset filter levels that are calibrated to. In an example, the electronic display comprises present filter levels that may be fine-tuned or changed as needed to accommodate the particular filter levels that are desired during calibration. Once the calibration step has been performed, the electronic display may be controlled to operate in synchrony with the iris, the focus, the zoom, or the light meter to provide the calibrated filter level with change of the iris, focus, zoom, or light meter to provide the desired degree of filtering for passage an image to the camera. In an example, a user controller facilitates synchronized operation of the electronic display with the at least one camera lens iris, camera lens focus, camera lens zoom, and light meter Configured in this manner, the electronic display provides desired levels of performance, e.g., light filtering, that are calibrated and may be fine-tuned to the particular changes in the camera lens element setting or ancillary camera system object to facilitate synchronized operation of the electronic display with the calibrated camera lens element or ancillary object, thereby avoiding the need for changing out filters during a change in camera lens setting, or manually changing a setting of the filter during a change in camera lens setting, which increases operational flexibility and camera operation efficiency. Further, the ability to provide a desired calibrated level of light filtering associated with a changed camera lens setting provides desired combined or synergistic optical characteristics on-the-run that were not otherwise possible or readily available, thereby greatly expanding the range of optical characteristics possible and available to a user of the camera system comprising such feature.

BRIEF DESCRIPTION OF THE DRAWINGS

Features and advantages of the systems, apparatuses, and methods as disclosed herein will become appreciated as the same become better understood with reference to the specification, claims, and appended drawings wherein:

FIG. 4 illustrates a front view of a control interface of a control terminal according to an embodiment of the present disclosure.

DETAILED DESCRIPTION

Figure 1:
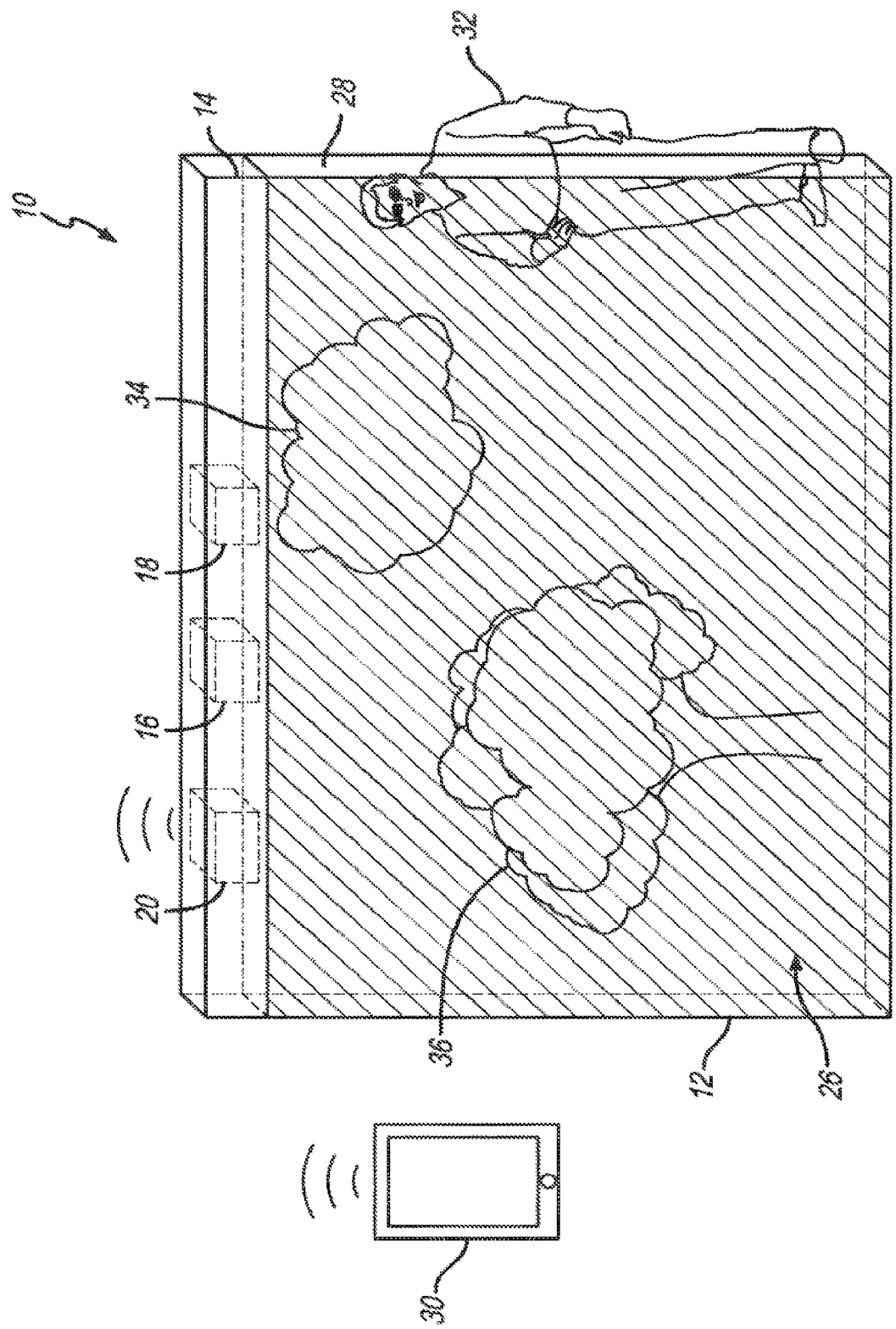
FIG. 1 illustrates a front view of a filter according to an embodiment of the present disclosure.

FIG. 1 illustrates a filter 10 according to an embodiment of the present disclosure. The filter 10 is preferably for use with a camera lens as part of a camera system. The filter 10 may include an electronic display 12 and may include a housing 14. The filter 10 may include a controller 16, a power source 18, and an input 20.

The electronic display 12 may be transparent (optically light transmissive) and may allow visible light to pass therethrough. The electronic display 12 may be configured such that filtering of the electronic display 12 is electronically controlled. The electronic display 12 may be configured to filter an image on an object side of the electronic display 12 for the camera lens. The filtering may occur through a variety of methods, and may include reducing the amount of light that is transmitted through the electronic display 12, or varying the color of the light that is passed through the electronic display 12, or otherwise varying the characteristics of the light passing therethrough. For example, the filtering may occur by filtering an image on the object side of the electronic display 12 by diffusing light transmitted through the electronic display 12, or flaring light transmitted through the electronic display 12 in a variety of directions, among other effects. The filtering may occur by emitting light from the electronic display 12 that is overlaid upon the image on the object side of the electronic display 12. The emitted light may vary the color or amount (intensity) of light that is received by the camera lens.

Figure 6B:
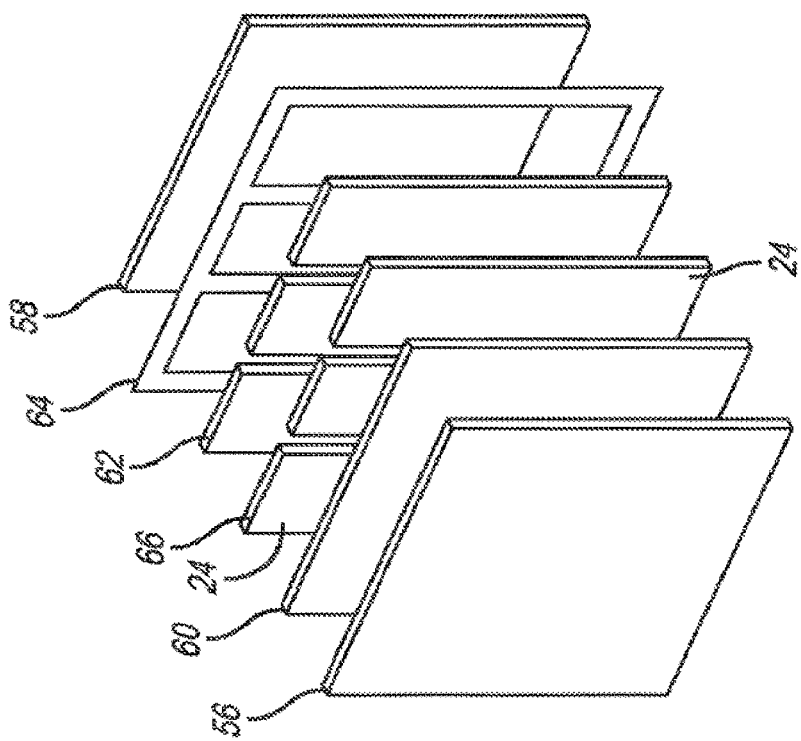
FIG. 6B illustrates a front perspective exploded view of a portion of an electronic display in which organic light-emitting diodes are utilized, according to an embodiment of the present disclosure.
Figure 6A:
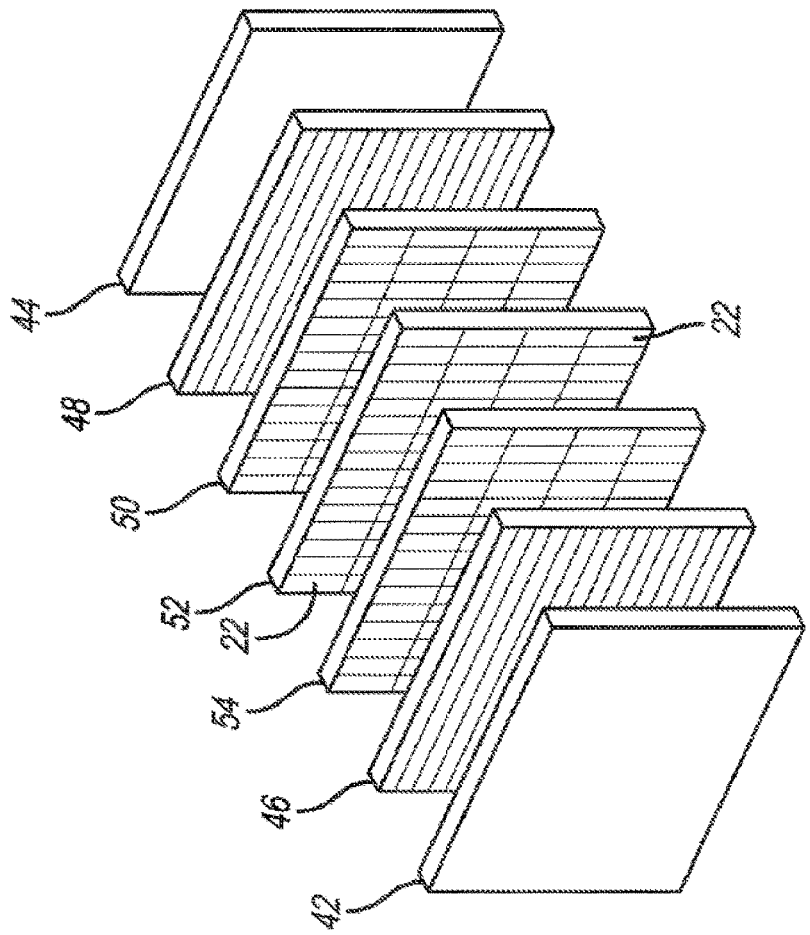
FIG. 6A illustrates a front perspective exploded view of a portion of an electronic display in which liquid-crystal is utilized, according to an embodiment of the present disclosure.

The electronic display 12 may include one or more pixels (represented in FIG. 6A as reference number 22 and in FIG. 6B as reference number 24). If multiple pixels are utilized, an array of pixels may be provided. In other embodiments, a single pixel (or 1×1 pixel arrangement) may be utilized. The electronic display 12 may utilize liquid-crystals contained in the electronic display 12 to perform the filtering of the image. The electronic display 12 may also utilize organic light-emitting diodes contained in the electronic display 12 for filtering the image. In other embodiments, other forms of electronic displaying may be utilized. For example, electronic displays as disclosed herein may make use of quantum dots and the like. It is to be understood that all forms of electronic technology that is capable of being adjusted for purposes of filtering an image for use with a camera is within the scope of electronic displays as disclosed herein.

The electronic display 12 may have a front surface 26, a rear surface (opposite the front surface), and may include one or more side surfaces 28. In FIG. 1, four side surfaces are shown. A housing 14 may be positioned at a side surface of the electronic display 12 and may form a border of the filter 10. In one embodiment, a border may extend around the entirety of the electronic display 12, and may form a frame for the electronic display 12. The housing 14 may comprise a part of the frame, and the frame may extend around all or a portion of the electronic display 12.

The filter 10 may be sized such that the filter may fit in a standard filter slot of a matte box. The filter 10 may be sized for camera use or cinematographic camera uses. The filter 10 may have a rectangular shape. In one embodiment, the filter 10 may be sized to be about 4 inches in the vertical dimension and about 5.65 inches in the horizontal dimension. In one embodiment, the filter 10 may be sized to be about 6 inches in the vertical dimension and about 6 inches in the horizontal dimension. The filter 10 may be sized to be about 4 millimeters thick. In other embodiments, the size of the filter 10 may be varied. In one embodiment, the dimensions of the filter 10 may be configured to be no more than 7 inches in the horizontal or vertical dimension. In one embodiment, the filter 10 may be configured to be no more than 6.5 inches in the horizontal or vertical dimension. In one embodiment, the thickness of the filter 10 may be sized to be no more than 10 millimeters thick. In one embodiment, the electronic display 12 may have a size that is no more than 7 inches in the horizontal or vertical dimension have a size that is no more than 6.5 inches in the horizontal or vertical dimension. In one embodiment, the electronic display 12 may have a size that is no more than 140 millimeters in the horizontal or vertical dimension. The size of the filter 10 and the electronic display 12 is preferably set to account for camera lens sizes, as the filter 10 is preferably used with camera lenses, which sizes are understood to vary depending on the particular type of camera and the camera use application.

In one embodiment, the shape of the filter 10 and the electronic display 12 may be varied from the shape shown in FIG. 1. For example, a round or circular shape, a square shape, or other shapes may be utilized. For example, the filter 10 and the electronic display 12 may be configured for fitment between camera lens elements, between the camera lens and the camera, or within the camera.

The electronic display 12 comprises a portion of the filter 10 for light to pass through. The housing 14 and other electrical components of the filter 10 are preferably positioned outside of the viewing aperture of the filter 10, such that the housing 14 and other electrical components do not obscure the view of the image being imaged by the camera lens. In other embodiments, however, the housing 14 and electrical components may be within the viewing aperture. For example, the housing 14 and/or electrical components may be transparent, such that the view of the image is not obscured by their presence.

A controller 16 may be used to electrically control the filtering of the electronic display 12. The controller 16 may be electrically coupled to the electronic display 12. The controller 16 may include a microprocessor of the like for controlling the filtering of the electronic display 12. The controller 16 may electrically control the filtering by varying the properties of the electronic display 12. For example, the controller 16 may cause the amount of light transmitted through the electronic display 12 to vary, or may cause the color of the light to vary, or may cause light to be emitted from the electronic display 12 that varies the image. It is to be understood that the controller will be configured differently as useful for purposes of varying one or more properties of the electronic display depending on the particular type of electronic technology being used. In the embodiment shown in FIG. 1, the controller 16 may be positioned within the housing 14. However, in other embodiments, the controller 16 may be located separate from the electronic display 12. For example, the controller may be part of a lens system, and may plug into the electronic display 12 when the electronic display 12 couples to the lens system. The controller 16 may also be positioned remote from the lens system and may otherwise communicate with and control the electronic display 12. The controller 16 may electrically connect with the electronic display 12 via electrical conduits (not shown). The electrical conduits may be transparent to avoid obscuring the image through the electronic display 12.

A power source 18 may be used to power electrical components of the filter 10. The power source may be positioned within the housing 14, as shown in FIG. 1, or in other embodiments may be positioned remote from the filter 10. For example, the power source 18 may be part of a lens system, and may plug into the filter 10 when the filter 10 couples to the lens system. In other embodiments, the power source 18 may be positioned remote from the lens system. The power source 18 may comprise a battery, capacitor, solar cell, AC or DC source, a plug for receiving external energy, among other forms of power sources. In one embodiment, the power source 18 may comprise an inductive receiver (such as an inductive coil or other form of receiver) for receiving inductive energy from an inductive transmitter (such as an inductive coil or other form of transmitter). The inductive receiver may be positioned proximate the inductive transmitter and may receive energy wirelessly for powering the filter 10 or charging a battery or other power storage device of the filter 10. In one embodiment, the power source 18 may be positioned within the viewing aperture of the electronic display 12, for example in an embodiment in which the power source 18 is transparent.

An input 20 may be for receiving a control for controlling the controller 16. The input 20 may be positioned within the housing 14, as shown in FIG. 1, or may be remote from the housing 14 in a similar manner as the controller 16 or power source 18. For example, the input 20 may be part of a lens system, and may plug into the filter 10 when the filter couples to the lens system. In other embodiments, the input 20 may be positioned remote from the lens system. The input 20 may comprise a wireless signal receiver. The input may operate to receive wireless signals via Wi-Fi, Bluetooth, peer-to-peer connection, cellular connection, radio connection, or other forms of wireless signal communication. In one embodiment, the input 20 may comprise a wired connection that physically connects to receive a control. For example, the wired connection may allow the operator of the camera system to control the electronic display 12. The wired connection may comprise a plug or other wired connection that receives a control. In one embodiment, the input 20 may comprise a manual input (such as a knob, button, slider, or other form of input) that allows a user to provide a control. Other forms of inputs 20 may also be utilized. The control that the input 20 receives may have a variety of forms, and may comprise a control signal, a manual input, or other form of control. The control may be provided wirelessly (or with a wired connection). The control may comprise a command for controlling the controller 16.

The input 20 may connect with a control terminal 30. The control terminal 30 may comprise a remote terminal that may wirelessly communicate with the input 20. The control terminal 30 may be configured to transmit a control to the input 20, and may also receive information from the input 20 regarding the status of the filter 10. In this manner, the input 20 may comprise a transmitter as well as a receiver. In one embodiment, the control terminal 30 may communicate with the input 20 via a wired connection. The control terminal 30 may comprise a computer, tablet, a smart phone, or may comprise another form of terminal device. The control terminal 30 may comprise a dedicated controller for the filter 10. The control terminal 30 for example, may be part of the lens system or camera system that the filter 10 is utilized with.

The control terminal 30 may be utilized to set or control the filtering of the electronic display 12. The control terminal 30 may have a control interface, which may be utilized by a user to set or control the filtering of the electronic display 12. For example, the control interface may be part of a software application (or "app") that is used to set or control the filtering of the electronic display 12. The control interface may also display information received regarding the status of the filter 10. FIG. 4, for example, illustrates the control terminal 30 in the form of a tablet. A display 31 may display the image received by the camera. The control terminal 30 may utilize a control interface in the form of a touch screen. The control interface may include interface controls 33 such as touch sliders that can vary the color, brightness, or other forms of filtering of the filter 10. In one embodiment, the user may touch certain parts of the control interface to indicate the location of the image where filtering should occur. For example, the user may encircle or otherwise touch the cloud 34 to select that the filtering for only the cloud should be varied. The user may select the entire image or a portion of the image for filtering, or different types of filtering, to occur. Other forms of control interfaces and interface controls 33 may be utilized.

In an example, the electronic display is a re-programmable electronic display configured for use with a camera system, camera lens, or camera lens system. While the electronic display is configured for use and placement in front of a camera lens, i.e., a front of lens configuration, as described below the electronic display as disclosed herein may be configured with an intermediate image of a relay system or any non-sequential optical system in which the ray path is diverted from a sequential cycle. Accordingly, it is to be understood that electronic displays as disclosed herein may alternatively be used behind a camera lens, e.g., interposed in a camera lens system or interposed between a camera lens system and the camera.

In other embodiments, other forms of software may be used to set or control the filtering of the electronic display 12. Other control interfaces may be utilized. For example, a standard keypad or series of buttons or knobs may be utilized as a control interface. The user may set a desired property of the filtering of the electronic display, or may select a sequence of varied filtering for the electronic display 12 to follow, along with other forms of controls.

Figure 5B:
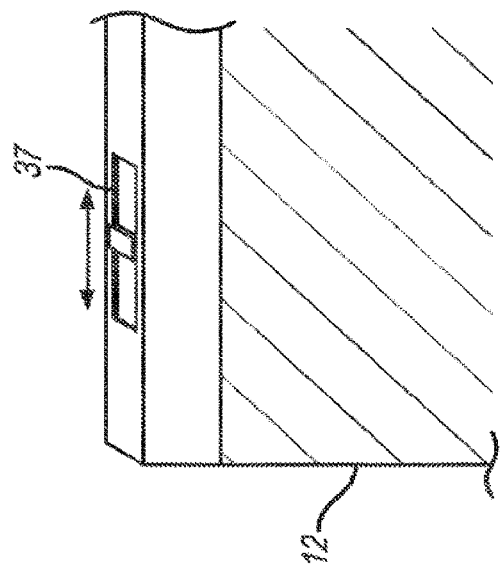
FIGS. 5A, 5B, and 5C each illustrate close-up views of inputs according to embodiments of the present disclosure.
Figure 5C:
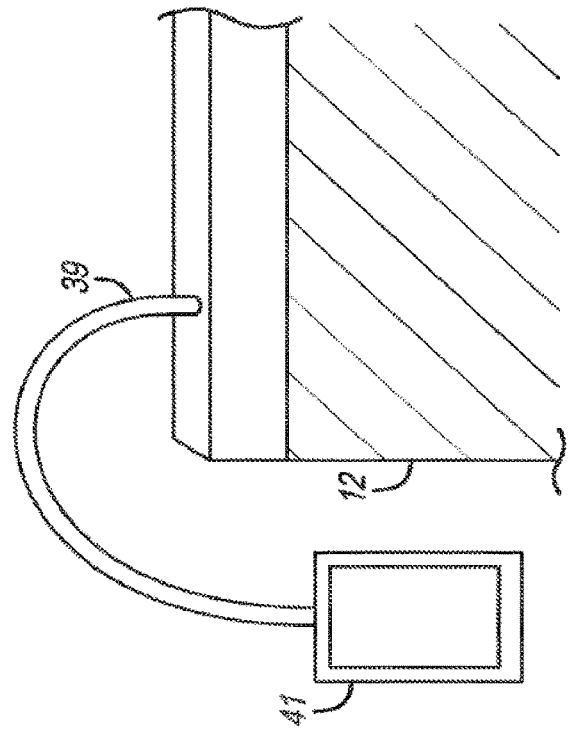
Figure 5A:
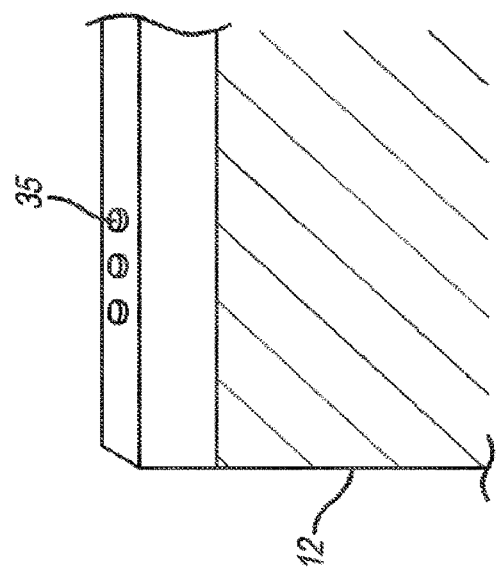
Figure 12:
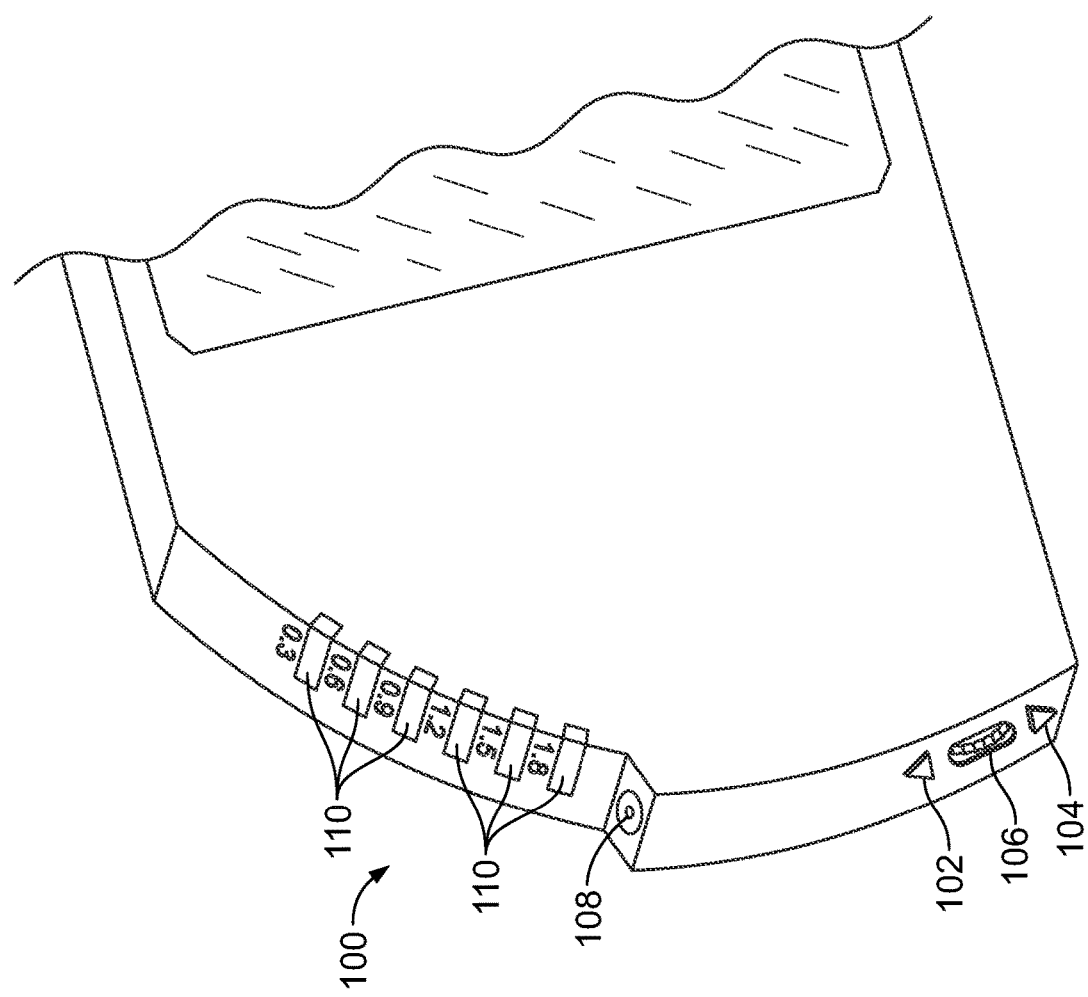
FIG. 12 illustrates a perspective partial view of an example electronic display as disclosed herein.

FIGS. 5A-5C illustrate other forms of inputs that may be utilized with the filters disclosed herein. In FIG. 5A, an input 35 in the form of one or more buttons may be provided on the body of the filter. The user may press the buttons to allow the input 35 to receive a control input for controlling the controller or for programming the filter. In FIG. 5B, an input 37 in the form of a slider may be provided on the body of the filter. In an example, the filter may include a single button, a series of buttons, and/or a slider or scroll wheel that enables a user to adjust or tune the level of filtering, e.g., when configured to function as a neutral density filter. In an example, the electronic display may be programmed to have preset levels of filtering. In an example, the electronic display may have six present levels of filtering accessible by such user input. In an example, the levels may be ND 0.3, ND 0.6, ND 0.9, ND 1.2, ND 1.5 and ND 1.8. While particular preset levels of filtering as a neutral density filter have been provided, it is to be understood that the electronic display as disclosed herein may be configured to provide a different number of preset filtering levels than six, and the associated level of filtering with each preset may vary from the example provided. Additionally, it is to be understood that while preset levels of filtering have been disclosed, the electronic display may be programed or configured to provide, instead of step changes between preset or fixed levels of filtering, a scaled, gradient or gradual level of filtering for purposes of providing a user with a fully customized level of fine-tuned filtering for each particular camera use or shot. With reference to FIG. 12, in an example, the electronic display 100 may comprise both buttons 102 and 104, and a scroll wheel 106 as a user interface to enable stepped or gradient fine-tuned adjustment in the degree of desired filtering levels (as described above) to provide stepped or gradient levels filtering to enable a greater degree of control for providing a custom filtering level and/or fine-tuning of the filtering level. The user may slide the slider to allow the input 37 to receive a control for controlling the controller. In FIG. 5C, an input in the form of a cord 39 coupled to a control terminal 41 may be coupled to the filter. The cord 39 may be removably inserted into an input, such as a serial input of the like, in the electronic display. The user may input controls via the control terminal 41 for controlling the controller and operation of the filter.

In an example, the electronic display is configured comprising an on-board processor and memory (not shown) that may be reprogrammable for purpose of adapting the electronic display to enable use with different types of lenses and/or cameras, and/or to enable the electronic display to function differently with the same camera/lens as called for by a particular shot or shooting environment. In an example, the electronic display may be configured to be reprogrammed by user input to the electronic display itself, or that may be performed wirelessly, or by wired electronic connection via a connection port such as a serial port or the like on the electronic display. With reference to FIG. 12, an example electronic display 100 comprises an inlet port 108, e.g., a serial inlet port, that is configured to accommodate connection with a cable or the like for programing the electronic display, for operating the electronic display, e.g., changing the filtering level produced by the electronic display, and/or for providing electrical power to the electronic display from a suitable power source. In an example, it is desired that the electronic display have a serial port connection 108 that is configured to enable the electronic display to be remotely controlled and/or reprogramed and/or powered. In an example, the electronic display is configured to be reprogrammable as described above, and configured to facilitate use with any suitable system that produces a serial output for purposes of controlling the electronic display, which includes and is not limited to injecting a command/transmission wirelessly to the electronic display with the use of an external dongle or the like that is connected with the serial port.

In an example, the electronic display processor and memory may comprise a bootloader or the like configured to allow reprogramming of the electronic display in the field for programming custom software to adapt the electronic display to be used for a specific shot. In such example, the electronic display may afterwards be reprogrammed in the field with the default software. Configured in this manner, providing the ability to be reprogrammed with custom software in the field, greatly expands the adaptability and flexibility of the electronic display to accommodate a wide variety of camera use applications (again without having to switch out or remove the electronic display from its attachment with the camera).

In one embodiment, the electronic display may be operated by being coupled to the lens controller of the camera system. For example, an input may be configured such that the filtering of the electronic display varies according to a variation in the iris, or focus, or zoom of the camera lens, or other optical feature of the camera lens, or a lighting condition near the camera or the object being shot as may be useful or desired. This may occur through a corded connection or other form of connection (e.g., wireless communication of the like) with the lens controller of the camera system or the like.

Electronic Display Synchronized To The Camera Lens Iris—In one embodiment, the electronic display may be configured to vary the degree of filtering with a variation of the camera lens iris. In such embodiment, the electronic display is synchronized to the iris so that movement of the iris causes a desired change in the degree of filtering provided by the electronic display. In an example, the iris and associated electronic display movement may be controlled wirelessly by a hand-held control device or controller (shown in FIG. 13) such as a Preston MDR-3 focus/iris controller or the like. While a particular type of camera lens control device has been disclosed, it is to be understood that other types of control devices may be used. In an example, this controller may be configured to operate the electronic display separately from the iris, and be configured to control the electronic display as synched with the iris by control commands sent to the iris and the electronic display, e.g., wherein the iris and electronic display are operated on a same control channel of the controller.

In an example, wherein the electronic filer is functioning as a neutral density filter that is synchronized to change with change of the iris, it is desired that the electronic display be specifically programed to match desired ND levels with different T stop settings of the iris, to thereby provide depth of field (DF) ramp mode settings that match the different iris settings. In an example, the default programmable electronic display settings for calibration with the iris stop settings are five consecutive neutral density settings. In such example, the neutral density setting starts with ND 0.6. The values are ND 0.6 (2 stops), ND 0.9 (3 stops), ND 1.2 (4 stops), ND 1.5 (5 stops), and ND 1.8 (6 stops). In an example, these neutral density values are matched by the user to the desired stop settings of the iris. The user matches these to maintain a constant level of exposure throughout the range of iris stop settings. This allows for the depth of field to vary from shallow (smaller stop of the iris) to large (larger stop) by changing the iris aperture while maintaining (through synchronized action of the electronic display) a constant level of exposure.

To calibrate the electronic display with the camera lens iris the existing electronic display neutral density setting is modified by erasing the default or previously stored settings, which can be done by user input to the electronic display by pressing a button or the like. With reference to FIG. 12, in an example, the default electronic display setting is erased by the user pressing and holding an inner arrow button 102 for a certain amount of time, e.g., approximately three seconds, while the electronic display 100 is in a normal mode. In an example, the electronic display has a visual indicator, e.g., in the form of one or more lights.110 When the default electronic displace setting has been erased, e.g., after the three seconds, the one or more lights 110 will go dark to indicate that erasure is complete. In an example, the visual indicator is in the form of one or more LEDs on the electronic display.

Once the default electronic display setting or DF ramp mode has been erased, the electronic display is ready to have its settings s entered by a user for purposes of then programming the DF ramp mode to the iris (during a calibration, pairing, or matching process). In an example, the electronic display is placed into setting programming mode, i.e., a DF ramp mode, by the user pressing and holding an outer arrow button 104 on the electronic display for a certain period of time. In an example, the outer arrow button is pressed and held until the electronic display provides a visual indication that the DF ramp mode has been entered. In an example, the period of time is approximately three seconds and the visual indication is the lighting of one or more lights 110 on the electronic display. In an example, the one or more lights are LED indicators that provide a teal light color indicating that the DF ramp mode has been entered. Once the electronic display programming mode is entered, the electronic display can be programmed to calibrate, match, or pair the neutral density levels with different states, i.e., T stop settings, of the lens iris.

In an example, the electronic display neutral density settings are is calibrated, matched, or paired with the camera/camera lens iris according to the following method. With the electronic display in a normal mode, e.g., with the default neutral density settings erased and the electronic display not in an enter state, the camera lens iris is set to the darkest desired T-stop setting for the electronic display neutral density setting or DF pull. In an example, this iris setting is calibrated, matched, or paired with one or more desired neutral density value or level of the electronic display. In an example where the electronic display is configured to provide a certain fixed number of stops or settings of neutral density, e.g., six stops, the darkest desired iris T-stop setting may be calibrated, matched or paired with two stops of neutral density, e.g., each at ND 0.6. The electronic display is then placed in the programming, i.e., DF ramp mode, enter state as described above. In this state, the electronic display neutral density setting may be adjusted by user input, e.g., by use of the wheel 106, to adjust and fine tune the calibration, matching, or pairing of the neutral density level with the specific iris T-stop setting. In an example, the neutral density setting is accepted by the electronic display by the user pressing the inner arrow button 102, and acceptance is visually confirmed by a blinking of one or more lights 110 on the electronic display. The iris is then set to the next desired T-stop setting, and the electronic display is adjusted as described above to provide another desired level of neutral density. In an example where the electronic display is configured having preset neutral density settings, the user may momentarily press the outer arrow button 104 to move to the next neutral density setting. The neural density value may be fine-tuned/adjusted to the iris T-stop setting as described above by use of the wheel 106, and the desired value accepted as described above by pressing the inner arrow button 102 and obtaining visual confirmation of acceptance. This process of adjusting the iris to the next T-stop setting and calibrating, matching, or pairing that T-stop setting with a desired neutral density level of the electronic display is repeated until all desired iris T-stops have been calibrated, matched, or paired with an electronic display neutral density level. This is an example method of calibrating the electronic display to the iris to facilitate synchronized operation between the two.

In an example wherein the electronic display is configured having six preset neutral density levels or values (wherein in an example each preset neutral density level has its own a designated light 110), it is desired that the last iris T-stop setting be no more than five stops removed from the initial T-stop setting, as the range of the electronic display neutral density settings is limited between ND 0.6 and ND 1.8 when the electronic display is placed in the DF ramp mode. If the camera use application or camera user calls for less than five iris T-stop settings then, during the process of calibrating, the electronic display neutral density level can be moved or skipped without moving to a new T-stop setting.

Once the electronic display has been calibrated, matched, or paired with the iris, if desired the iris range may be adjusted should the need arise, e.g., if the sun goes in or out of cloud cover. This can be done by placing the electronic device in programming enter mode, e.g., DF ramp mode, as described above. To open the iris range by one stop, e.g., to go from a range of T 11 to T 2.8 to a range of T 8 to T 2, the user may press the outer arrow button 104 on the electronic display once. To close the iris range by one stop, e.g., to go from a range of T 8 to T 2 to a range of T 11 to T 2.8, the user may press the inner arrow button 102 on the electronic display once. For fine adjustment of the neutral density level to accommodate the adjusted iris range, the electronic filter neutral density level can also be moved up or down by the user moving the wheel 106 between the two arrow buttons.

Once the desired calibration of the electronic display and iris is completed, the electronic filter programming mode, e.g., DF ramp mode, may be exited and the electronic display returned to normal operation by pressing and holding the outer arrow button 104 on the electronic display for a period of time, e.g., three seconds, until the LED lights 110 no longer illuminate. In an example, the electronic display is configured to store the programmed iris calibrated neutral density settings, e.g., DF ramp mode settings, in an on-board memory. If the electronic display is power cycled, the settings will read back from memory on power on. If the electronic display is to be used with a new lens, the calibration procedure will be repeated for synchronizing electronic display and iris operation, in which case a user will erase the existing calibrated settings (as described above) associated with the removed lens, and reprogram and calibrate, match, or pair the iris T-stop settings of the new lens with the electronic display neutral density levels in the manner earlier described. Configured in this manner, the electronic display may be programmed to be calibrated for synchronized iris operation with a variety of different camera lenses.

While a particular method has been described above for calibrating, matching, or pairing the electronic display neutral density levels with camera lens iris T-stop levels, it is to be understand that this is but one approach and that other approaches that function in a similar manner to pair or match neutral density levels with iris T-stop levels are within the scope of the electronic display as disclosed herein. For example, the electronic display as disclosed herein may have more or less than six preset neutral density settings that may be different than those specifically described, and/or may have a continuous gradient of different possible neutral density levels that are preset or otherwise, and for such embodiments the process of calibrating, matching, or pairing the iris T-stop settings with such neutral density levels may involve the same general approach as described wherein the iris T-stop settings are each calibrated with one or more desired electronic display neutral density levels. In an example, as the iris is moved from a closed position to a more open position it is desired that the paired neutral density level of the electronic display increases thereby functioning to diminish the amount of light passing through the electronic display and to the camera lens.

As an alternative to the method described above for calibrating the iris settings to the electronic display neutral density levels or settings, electronic displays as disclosed herein may be configured to include a memory having stored therein calibrated iris T-stop settings and associated neutral density levels for different types of lenses. For example, the electronic display may be configured so that such existing iris calibration information may be loaded into or downloaded to the memory of the electronic display by well-known techniques. It is to be understood that all such alternative processes for calibrating the electronic display to the iris is intended to be within the scope of the electronic display as disclosed herein.

Figure 13:
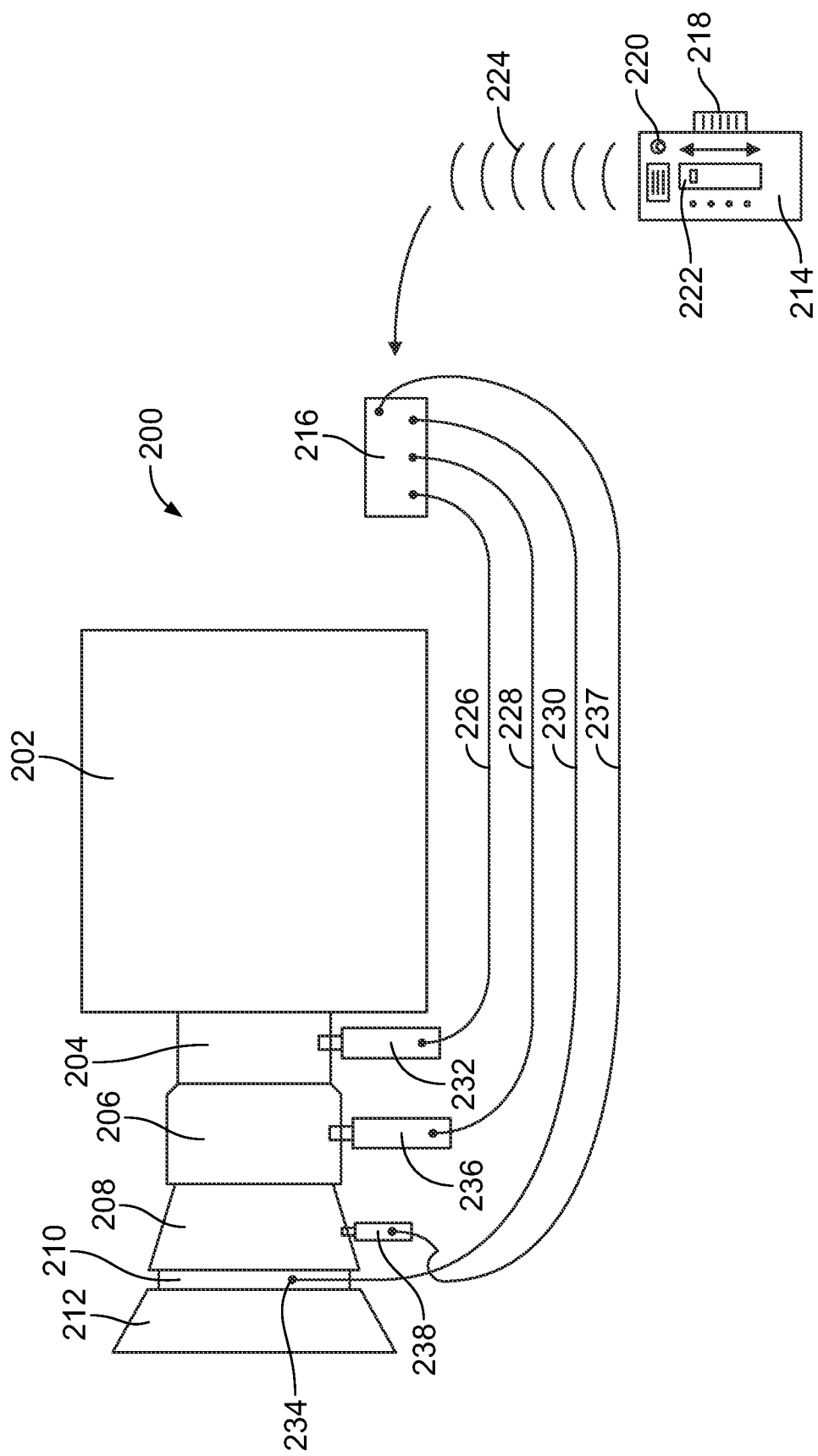
FIG. 13 illustrates a schematic view of an example camera system comprising an example electronic display as disclosed herein as operated by an example user controller.

In an example, the user controller may be configured as described above to control the electronic display and the iris T-stop setting. FIG. 13 illustrates an camera system 200 comprising a camera 202 as connected with a camera lens iris 204, a camera lens focus 206, a camera lens zoom 208, an electronic display 210, a matte box 212, a user controller 214, a receiver/transmitter or transceiver device 216, and electrical cables 226, 228, and 230. In an example, the controller 214 may be configured to send out control signals using one or more different channels. In an example, where synchronized operation of the electronic display and the iris is desired, the electronic display 210 and iris 204 are configured to receive signals from the controller 214 that are on the same channel to thereby enable synchronized operation of the electronic display and iris by the user manipulating a single control feature or element of the controller. In an example, the controller 214 may enable synchronized operation of the electronic display and iris by moving an iris control element on the controller, which may be in the form of a knob 218, a switch 220, a slider 222, or the like. In an example, the controller 214 sends out a wireless iris control signal 224 on a single channel that is received by the receiver/transmitter device 216. In an example, the receiver/transmitter device 216 is configured to convert the wireless signal received to an electronic signal, and direct the electronic control signal via separate cabling 228 and 230 to each of operating mechanism 232 move the iris 204 and to the serial input 234 of the electronic display 210 to change neutral density level as calibrated to the iris 204.

Electronic Display Synchronized To The Camera Lens Focus—In one embodiment, the electronic display may be configured to vary the degree of filtering with variation of the camera lens focus. In such embodiment, the electronic display is synchronized to operate with the focusing mechanism so that a change in focus causes a desired/calibrated change in the degree of filtering provided by the electronic display. In an example, the ability to synchronize the electronic display to the focusing action of a photographic objective operates to compensate the stop loss associated with macro/micro photography. Traditionally, the illumination loss encountered in macro/micro photography has been accommodated by a manual adjustment of the iris during the focus pull or ramp. Such traditional method is not precise and creates an additional change in observed depth of field and out of focus characteristics. Thus, synchronizing the operation of the electronic display to the focus is desired as it operates to compensate the aperture loss to a much high degree of resolution and maintain a constant observed depth and constant out-of-focus characteristic of the captured image when focusing at macro conjugate objects.

In an example, the focus and electronic display movement may be controlled, e.g., wirelessly, by a hand-held controller or control system as described above. In an example, this controller may be used to control the electronic display as synched with the focus, e.g., by control signal or commands sent to the focus mechanism where the focus mechanism and electronic display are operated on the same control channel. While the above method of controlling operation of the electronic display and focus in synchrony has been disclosed, it is to be understood that there is a variety of different methods or approaches for accomplishing the same function and that all such other methods and approaches are intended to be within the scope of this disclosure.

In an example, wherein the electronic display is functioning as a neutral density filter that is synchronized to change with the focus, it is desired that the electronic display be specifically programed to modify the neutral value settings, e.g., a macro focus mode setting. To calibrate the electronic display with the camera lens focus neutral density settings, e.g., macro focus mode settings, are modified by erasing the default or previously stored setting, which can be done by user input to the electronic display by pressing a button or the like. In an example, the electronic display neutral density setting is erased in the same manner described above for calibrating the electronic display 100 with the iris, i.e., by the user pressing and holding an inner arrow button 102 for a certain amount of time, e.g., approximately three seconds, while the electronic display is in a normal mode. In an example, the electronic display has a visual indicator, e.g., in the form of one or more lights 110. When the neutral density setting, e.g., macro focus mode setting, has been erased, e.g., after the three seconds, the one or more lights will go dark to indicate that erasure is complete. In an example, the visual indicator is in the form of one or more LEDs on the electronic display.

Once the default or previous neutral density setting, e.g., macro focus mode setting, has been erased, the electronic display is entered by a user for purposes of then programming the neutral density settings, e.g., in a macro focus mode, to the focus (during a calibration, matching, or pairing process). In an example, the electronic display is entered into a programming mode, e.g., a macro focus mode by the user pressing and holding an outer arrow button 104 on the electronic display 100 for a certain period of time. In an example, the outer arrow button is pressed and held until the electronic display provides a visual indication that the programming mode, e.g., the macro focus mode has been entered. In an example, the period of time is approximately three seconds and the visual indication is the lighting of one or more lights 100 on the electronic display. In an example, the one or more lights are LED indicators that provide a teal light color indicating that the macro focus mode has been entered. Once the electronic display programming mode, e.g., the macro focus mode, is entered, the electronic display can be programmed to calibrate, match, or pair with different states or settings of the focus.

In an example, the electronic display is calibrated, matched, or paired with the camera lens focus according to the following method. With the electronic display in a normal mode, e.g., with the default or previous neutral density setting erased and the electronic display not in an enter state, the camera lens focus is set to a desired initial focal value for programming with the electronic display. In an example, this focal value or setting is calibrated, matched, or paired with one or more desired neutral density value or level of the electronic display. In an example where the electronic display is configured to provide a certain fixed number of stops or settings of neutral density, e.g., six stops. In an example, the electronic display is configured to provide five neutral density settings as calibrated with the camera lens focus. In such example, the initial focal value may be calibrated, matched or paired with two stops of neutral density, e.g., each at ND 0.6. The electronic display is then placed in the programming mode, e.g., the macro focus mode, as described above. In this state, the electronic display neutral density setting may be adjusted by user input, e.g., by use of the wheel 106, to adjust and fine tune the calibration, matching, or pairing of the neutral density level with the specific focus value or setting. In an example, the neutral density setting is accepted by the electronic display by the user pressing the inner arrow button 102, and acceptance is visually confirmed by a blinking of the lights 110 on the electronic display. The camera lens focus is then moved to a next value or setting, and the electronic display is adjusted to provide another desired level of neutral density. In an example where the electronic display is configured having set neutral density settings, the user may momentarily press the outer arrow button 104 to move to the next neutral density setting. The neural density value may be fine-tuned or adjusted to the focus value or setting as described above by use of the wheel 106, and the desired neutral density value may be accepted as described above by pressing the inner arrow button 102 and obtaining visual confirmation of acceptance. This process of adjusting the camera lens focus to the next value or setting and calibrating, matching, or pairing that focus value or setting with a desired neutral density level of the electronic display is repeated until all desired focus levels have been calibrated, matched, or paired with an electronic display neutral density level. This is an example method of calibrating the electronic display to the focus to facilitate synchronized operation between the two.

In an example wherein the electronic display is configured having six set neutral density levels or values, it is desired that the last focus value or setting be no more than five settings removed from the initial focus value or setting, as the range of the electronic display neutral density settings for calibration is limited to five settings between ND 0.6 and ND 1.8 when the electronic display is placed in the programming mode, e.g., the macro focus mode. If the camera use application or camera user calls for or desires less than five focus values or settings then, during the process of calibrating, the neutral density level can be moved or skipped without moving to a new focus value or setting.

Once the electronic display has been calibrated, matched, or paired with the camera lens focus, if desired the exposure range may be adjusted should the need arise, e.g., if the sun goes in or out of cloud cover. This can be done when by placing the electronic display into programming mode, e.g., macro focus mode, as described above. To open the exposure range by one value or setting, the user may press the outer arrow button 104 on the electronic display once. To close the exposure range by one value or setting, the user may press the inner arrow button 102 on the electronic display once. For fine adjustment, the exposure range can also be moved up or down by the user moving the wheel 106 between the two arrow buttons.

Once the desired calibration of the electronic display and focus is completed, the programmed neutral density settings may be exited and the electronic display returned to normal operation by pressing and holding the outer arrow button 104 on the electronic display for a period of time, e.g., three seconds, until the LED lights no longer illuminate. The electronic display is configured to store the programmed calibrated focus and neutral density settings in an on-board memory. If the electronic display is power cycled, the settings will read back from memory on power on. If the electronic display is to be used with a new lens, then the calibration procedure will be repeated for providing desired synchronizing operation of the electronic display and camera lens focus, in which case a user will erase the existing calibrated neutral density settings (as described above) associated with the removed lens, and reprogram and calibrate, match, or pair the focus values or settings of the new lens with the electronic display neutral density levels in the manner earlier described. Configured in this manner, the electronic display may be programmed to be calibrated for synchronized focus operation with a variety of different camera lenses.

While a particular method has been described above for calibrating, matching, or pairing the electronic display neutral density levels with camera lens focus values or settings, it is to be understand that this is but one approach and that other approaches that function in a similar manner to calibrate, match, or pair neutral density levels with focus values or settings are intended to be within the scope of the electronic display as disclosed herein. For example, the electronic display as disclosed herein may have more or less than six neutral density settings that may be different than those specifically described, and/or may have a continuous gradient of different possible neutral density levels, and for such embodiments the process of calibrating, matching, or pairing the focus values or settings with such neutral density levels may involve the same general approach as described wherein the focus value or settings are each calibrated with one or more electronic display neutral density levels. In an example, as the focus is moved from an initial value to a final value it is desired that the paired neutral density level of the electronic display value increases thereby diminishing the amount of light passing through the electronic display and to the camera lens.

As an alternative to the method described above for calibrating the focus values or settings to the electronic display neutral density levels or settings, electronic displays as disclosed herein may be configured to include a memory having stored therein calibrated focus values and associated neutral density levels for different types of lenses. For example, the electronic display may be configured so that such existing calibration information may be loaded into or downloaded to the memory of the electronic display by well-known techniques. It is to be understood that all such alternative processes for calibrating the electronic display to the focus is intended to be within the scope of the electronic display as disclosed herein.

In an example, the user controller 214 may be configured as described above to control the electronic display 210 and the focus value or setting. In an example, the controller may be configured to control the focus by user input as described above, which input may be the same or different from that of the iris. In an example, the focus is controlled by a user input different from the iris. For synchronized operation of the electronic display and focus the controller 214 is configured to control the focus 206 using one channel. In an example, the controller 214 provides a wireless control signal 224 over the one channel that is received by the receiver/transmitter device 216 disclosed above, that operates to convert the received control signal from the controller and provide a control signal separately via a wired cable 228 to an operating mechanism 236 that moves the focus 206, and via wire cable 230 to the serial input 234 of the electronic display 210. Configured in this manner, when the user operates the controller 214 to change the focus, the electronic display is also changed to a calibrated neutral density value. While the above method of controlling operation of the electronic display and focus in synchrony has been disclosed, it is to be understood that other methods or approaches for accomplishing the same function may exist, and that all such other methods and approaches are intended to be within the scope of this disclosure.

Electronic Display Synchronized to the Camera Lens Iris and Camera Lens Focus—As described above, the electronic display may be calibrated to provide synchronized operation with the camera lens iris or the camera lens focus. In another example, the electronic display may be configured for synchronized operation of one of the iris or the focus as described above with respect to each, while the iris and focus are configured to provide synchronized operation with each other. In an example, the electronic display may be calibrated with the iris, and the controller 214 may be configured to provide synchronized operation of the iris 204 and the electronic display 210 as described above. Additionally, the camera lens focus 206 may be operated with the controller 214 to provide synchronized operation with the iris 204, which in an example may be accomplished by the controller 214 providing control signal, e.g., a wireless signal, for the iris 204 on a single channel. In an example, the receiver/transmitter device 216 receives the control signal from the controller, e.g., provider wirelessly, and provides three electronic control signals separately, e.g., by cable connections 226, 228, and 230, to each of the operating mechanism 232 moving the iris 204, the operating mechanism 236 moving the focus 206, and to the serial port 234 of the electronic display 210. In this example, the focus operates in synchrony with the iris, and electronic display operates in synchrony with the iris to provide a neutral density level calibrated with the iris. Alternatively, the electronic display may be calibrated to the focus, and the controller operates to provide a control signal the via the receiver/transmitter device that causes the iris to operate in synchrony with the focus, wherein the electronic display operates in synchrony with the focus to provide a neutral density level calibrated with the focus. The above examples are illustrative of a few ways that the electronic display as disclosed herein can be calibrated and operated in synchrony with both the camera lens iris and camera lens focus. It is understood that calibration and/or control methods and approaches other than those described above may be used to achieve the such synchronized operation of the electric display, iris, and focus, and that all such other methods and approaches are intended to be within the scope of this description.

For the above provided example, it is understood that the electronic display is programmed and calibrated in the same manner described above with respect to the iris and/or the focus.

Electronic Display Synchronized To The Camera Lens Zoom—In one embodiment, the electronic display may be configured to vary the degree of filtering with variation of the camera lens zoom. In such embodiment, the electronic display is synchronized to the zoom so that a change in the zoom causes a desired/calibrated change in the degree of filtering provided by the electronic display. Synchronizing the operation of the electronic display to the zoom is desired because in non-fixed pupil zoom lenses, the stop of the lens changes as one moves through the zoom and focus characteristic (macro characteristics) of the lens and the neutral density change compensates for the stop differential. In an example, the zoom and electronic display movement may be controlled, e.g., wirelessly, by a hand-held controller 214 or control system as described above. In an example, the controller 214 may be used to control the electronic display as synched with the zoom 208, e.g., by control signal or commands sent to the zoom mechanism where the camera lens zoom and electronic display are operated on the same control channel. While the above method of controlling operation of the electronic display and zoom in synchrony has been disclosed, it is to be understood that there is a variety of different methods or approaches for accomplishing the same function and that all such other methods and approaches are intended to be within the scope of this disclosure.

In an example, wherein the electronic display is functioning as a neutral density filter that is synchronized to change with the zoom, it is desired that the electronic display be specifically programed to modify the neutral value settings, e.g., a zoom mode setting. To calibrate the electronic display with the camera lens zoom, neutral density settings, e.g., zoom mode settings, are modified by erasing the default or previously stored neutral density setting, which can be done by user input to the electronic display by pressing a button or the like. In an example, the electronic display neutral density setting is erased in the same manner described above for calibrating the electronic display 100 with the iris, i.e., by the user pressing and holding an inner arrow button 102 for a certain amount of time, e.g., approximately three seconds, while the electronic display is in a normal mode. In an example, the electronic display has a visual indicator, e.g., in the form of one or more lights 110. When the neutral density setting, e.g., zoom mode setting, has been erased, e.g., after the three seconds, the one or more lights will go dark to indicate that erasure is complete. In an example, the visual indicator is in the form of one or more LEDs on the electronic display.

Once the default or previous neutral density setting, e.g., zoom mode setting, has been erased, the electronic display is entered by a user for purposes of then programming the neutral density settings, e.g., in zoom mode, to the zoom (during a calibration, matching, or pairing process). In an example, the electronic display is entered into a programming mode, e.g., a zoom mode by the user pressing and holding an outer arrow button 104 on the electronic display for a certain period of time. In an example, the outer arrow button 104 is pressed and held until the electronic display provides a visual indication that the programming mode, e.g., the zoom mode has been entered. In an example, the period of time is approximately three seconds and the visual indication is the lighting of one or more lights 110 on the electronic display. In an example, the one or more lights are LED indicators that provide a teal light color indicating that the zoom mode has been entered. Once the electronic display programming mode, e.g., the zoom mode, is entered, the electronic display can be programmed to calibrate, match, or pair with different states or settings of the zoom.

In an example, the electronic display is calibrated, matched, or paired with the camera lens zoom according to the following method. With the electronic display in a normal mode, e.g., with the default or previous neutral density setting erased and the electronic display not in an enter state, the camera lens zoom is set to a desired initial zoom value for programming with the electronic display. In an example, this zoom value or setting is calibrated, matched, or paired with one or more desired neutral density value or level of the electronic display. In an example where the electronic display is configured to provide a certain fixed number of stops or settings of neutral density, e.g., six stops, the electronic display is configured to provide five neutral density settings as calibrated with the camera lens zoom. In such example, the initial zoom value may be calibrated, matched or paired with two stops of neutral density, e.g., each at ND 0.6. The electronic display is then placed in the programming mode, e.g., the macro focus mode, as described above. In this state, the electronic display neutral density setting may be adjusted by user input, e.g., by use of the wheel 106, to adjust and fine tune the calibration, matching, or pairing of the neutral density level with the specific zoom value or setting. In an example, the neutral density setting is accepted by the electronic display by the user pressing the inner arrow button 102, and acceptance is visually confirmed by a blinking of the lights 110 on the electronic display. The camera lens zoom is then moved to a next value or setting, and the electronic display is adjusted to provide another desired level of neutral density. In an example where the electronic display is configured having preset neutral density settings, the user may momentarily press the outer arrow 104 button to move to the next neutral density setting. The neural density value may be fine-tuned or adjusted between the preset values to the zoom value or setting as described above by use of the wheel 106, and the desired neutral density value may be accepted as described above by pressing the inner arrow button 102 and obtaining visual confirmation of acceptance. This process of adjusting the camera lens zoom to the next value or setting and calibrating, matching, or pairing that zoom value or setting with a desired neutral density level of the electronic display is repeated until all desired zoom levels or settings have been calibrated, matched, or paired with an associated electronic display neutral density level. This is an example method of calibrating the electronic display to the zoom to facilitate synchronized operation between the two.

In an example wherein the electronic display is configured having six set neutral density levels or values, it is desired that the last zoom value or setting be no more than five settings removed from the initial zoom value or setting, as the range of the electronic display neutral density settings for calibration is limited to five settings between ND 0.6 and ND 1.8 when the electronic display is placed in the programming mode, e.g., the zoom mode. If the camera use application or camera user calls for or desires less than five zoom values or settings then, during the process of calibrating, the neutral density level can be moved or skipped without moving to a new zoom value or setting.

Once the electronic display has been calibrated, matched, or paired with the camera lens zoom, if desired the exposure range may be adjusted should the need arise, e.g., if the sun goes in or out of cloud cover. This can be done when by placing the electronic display into programming mode, e.g., zoom mode, as described above. To open the exposure range by one value or setting, the user may press the outer arrow 104 button on the electronic display once. To close the exposure range by one value or setting, the user may press the inner arrow button 102 on the electronic display once. For fine adjustment, the exposure range can also be moved up or down by the user moving the wheel 106 between the two arrow buttons.

Once the desired calibration of the electronic display and zoom is completed, the programmed neutral density settings may be exited and the electronic display returned to normal operation by pressing and holding the outer arrow button 104 on the electronic display for a period of time, e.g., three seconds, until the LED lights no longer illuminate. The electronic display is configured to store the programmed calibrated zoom and neutral density settings in an on-board memory. If the electronic display is power cycled, the settings will read back from memory on power on. If the electronic display is to be used with a new lens, then the calibration procedure will be repeated for providing desired synchronizing operation of the electronic display and camera lens zoom, in which case a user will erase the existing calibrated neutral density settings (as described above) associated with the removed lens, and reprogram and calibrate, match, or pair the zoom values or settings of the new lens with the electronic display neutral density levels in the manner earlier described. Configured in this manner, the electronic display may be programmed to be calibrated for synchronized zoom operation with a variety of different camera lenses.

While a particular method has been described above for calibrating, matching, or pairing the electronic display neutral density levels with camera lens zoom values or settings, it is to be understand that this is but one approach and that other approaches that function in a similar manner to calibrate, match, or pair neutral density levels with zoom values or settings are intended to be within the scope of the electronic display as disclosed herein. For example, the electronic display as disclosed herein may have more or less than six neutral density settings that may be different than those specifically described, and/or may have a continuous gradient of different possible neutral density levels, and for such embodiments the process of calibrating, matching, or pairing the zoom values or settings with such neutral density levels may involve the same general approach as described wherein the zoom value or settings are each calibrated with one or more electronic display neutral density levels. In an example, as the zoom is moved from an initial value to a final value it is desired that the paired neutral density level of the electronic display value increases thereby diminishing the amount of light passing through the electronic display and to the camera lens.

As an alternative to the method described above for calibrating the zoom values or settings to the electronic display neutral density levels or settings, electronic displays as disclosed herein may be configured to include a memory having stored therein calibrated zoom values and associated neutral density levels for different types of lenses. For example, the electronic display may be configured so that such existing calibration information may be loaded into or downloaded to the memory of the electronic display by well-known techniques. It is to be understood that all such alternative processes for calibrating the electronic display to the zoom is intended to be within the scope of the electronic display as disclosed herein.

In an example, the user controller may be configured as described above to control the electronic display and the zoom value or setting. In an example, the controller 214 may be configured to control the zoom by user input as described above, which input may be the same or different from that of the iris or focus. In an example, the camera lens zoom 208 is controlled by a user input different from the iris or focus. For synchronized operation of the electronic display and zoom, the controller 214 is configured to control the zoom using one channel. In an example, the controller 214 provide a wireless control signal 224 over the one channel that is received by the receiver/transmitter device 216 disclosed above, that operates to convert the received control signal from the controller and provide an electrical control signal separately via cable 237 input to an operating mechanism 238 that moves the zoom 208, and cable 230 connected to the serial input 234 of the electronic display 210. Configured in this manner, when the user operates the controller 214 to change the zoom, the electronic display is also changed to a calibrated neutral density value. While the above method of controlling operation of the electronic display and zoom in synchrony has been disclosed, it is to be understood that there is a variety of different methods or approaches for accomplishing the same function and that all such other methods and approaches are intended to be within the scope of this disclosure.

If desired, the zoom may be operated in synchrony with one or more of the iris or the focus, wherein the electronic display is calibrated to one of the iris, focus, or zoom in the manner described above. In such an example, the controller may be configured and operated to provide a control signal, e.g., on a single channel, that is received wirelessly by the receiver/transmitter device, wherein the transmitter device is configured to send control signals via separate cables to the zoom and focus, the zoom and iris, or the zoom, iris and focus, and to the electronic display for the desired synchronized movement of the zoom with one or more of the iris and focus, wherein the electronic display is calibrated to one of such camera lens elements.

Figure 14:
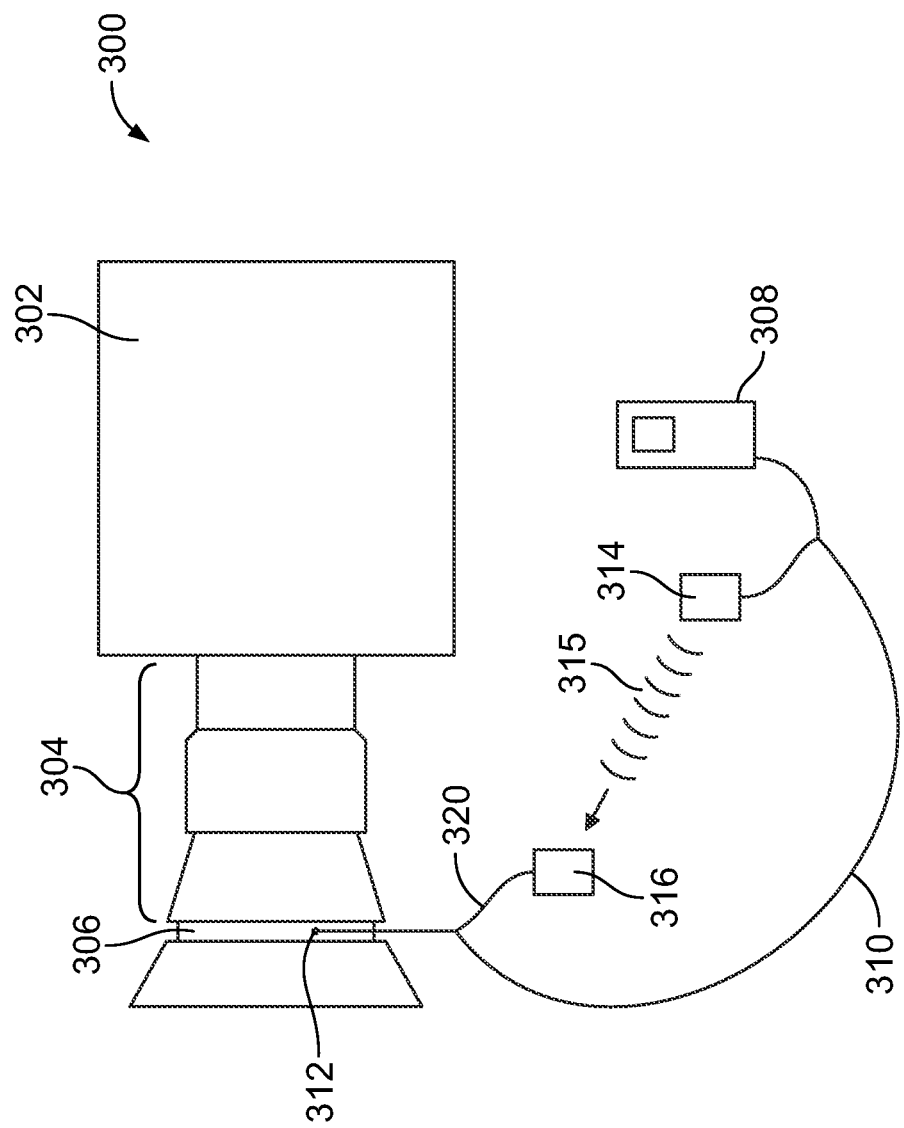
FIG. 14 illustrates a schematic view of an example camera system comprising an example electronic display as disclosed herein as used with an example light meter.

Electronic Display Synchronized To A Light Meter—In an example, the electronic display may be synchronized to light meter exposure measurement, wherein light exposure information provided to the electronic display by a light meter may operate to change the filter level of the electronic display. FIG. 14 illustrates a camera system 300 comprising a camera 302, a camera lens system 304, and an electronic display 306. In an example, the electronic display may be configured to accommodate light meter exposure measurements information stored in its memory, which may be downloaded to the electronic display memory by wireless or wired communication with a source of the light meter exposure measurements, e.g., in the form of a table or the like that matches light meter exposure measurements with neutral density levels or values. Alternatively, the electronic display may be calibrated by a user in a manner similar to that describe for the camera lens elements, to provide selected neutral density levels paired to light meter exposure measurements, e.g., by using the buttons on the electronic device and sequences of steps for calibration as described above. In an example, a light meter 308 (such as a TENMA 72-7250 digital light meter) may be used to send an exposure measurement to the electronic display by wireless or wired connection with the electronic display, and the electronic display may change the neutral density level produced based on the stored exposure measurement calibration information. In an example, such as where the light meter is being used close to the camera system, the light meter exposure measurement may be sent to the electronic display 306 by electrical cable 310 connected with the electronic display serial input 312. In an example, such as where the light meter is being used close to an object being captured by the camera system, the light meter exposure measurement may be sent to the electronic display 306 wirelessly such as by the use of a wireless transmitter 314 that sends the exposure measurement wirelessly 315 to a wireless receiver 316, wherein the wireless transmitter 314 is connected to the light meter 308 by cable 318 and the wireless receiver is connected to the serial input 312 of the electronic display 306 by cable 320.

In an example, the electronic display may be used in this manner according to at least two different modes operation. In an example, the electronic display may operate in a continuous meter mode, wherein the light meter is continuously providing exposure measurement info to the electronic display, and the electronic display is changing neutral density levels as needed to address different exposure measurements. In an example, the electronic display may operate in a non-continuous meter mode where the exposure measurement measurements are sent to the electronic display intermittently and changes are then made to the neutral density level based on the received exposure measurement. In an example, the light meter may be positioned in any location called for by the particular camera shooting use and/or application, e.g., the light meter may be positioned proximate to the camera or may be positioned near an object/image of interest being captured by the camera lens.

While a particular example an electronic display as synchronized for use with a light meter and methods of using the same have been described, it is to be understood that there may exist different methods of implementing such synchronized light meter and electronic display use that provide the same desired functionality, and that all such different methods or variations are intended to be within the scope of electronic displays as disclosed herein.

Electronic displays as disclosed herein having programmable features, e.g., filter level settings may be configured for placement and used in different camera system locations. An noted above, it is understood that while electronic displays as disclosed herein may be placed at an object side of a camera lens, e.g., in front of the lens, that such programmable electronic displays as disclosed herein may be placed between different elements or sections of a camera lens, may be placed between the camera lens and the camera, e.g., behind the lens, or may be placed inside the camera depending on the particular end-use application, and that all such electronic display placements are intended to be within the scope of electronic displays as disclosed herein.

In one embodiment, the filter may be operated autonomously based on the image received or provided to the camera. A sensor may be utilized to detect the image provided to the camera, and a control may be provided to the filter input to vary the filtering automatically based on the received image. For example, if a scene is bright, the filter may be configured to automatically decrease the brightness of the image. The sensor may be located with the camera or may be located elsewhere. In one embodiment, the camera may be configured to provide a control to the input of the filter based on the image received by the camera. For example, if the camera (such as a digital image sensor of the camera) detects it is viewing a bright scene it may provide a control to the input of the filter to reduce the brightness. The filter accordingly may operate in a feedback loop based on the image.

The electronic display 12, the controller 16, the power source 18, and/or the input 20 may comprise a unit that is removably coupled to a lens system. The unit may comprise the electronic display 12 and housing 14 coupled together as shown in FIG. 1. The unit may be sized such that it has a similar size and shape as current non-electronic displays and accordingly may be swapped out for these non-electronic displays and used with similar matte boxes or other methods of coupling filters to lenses. In one embodiment, the filter 10 and its components may be integral with a lens system, and may not be removable. In other embodiments, certain components may be separable from the lens system and certain may be integral with the lens system. In other embodiments, certain components disclosed herein may be excluded entirely.

The electronic display 12 may filter the image to a desired amount or in a certain manner. In the embodiment shown in FIG. 1, the electronic display 12 is filtering the entirety of the image that is viewed through the electronic display 12. The image includes a person 32, a cloud 34, and a tree 36. The entirety of the tree 36, the entirety of the cloud 34 and a portion of the person 32 are filtered (the filtering is represented with diagonal lines in FIG. 1). The filtering may occur by reducing the amount of light from the image that is transmitted through the electronic display 12, or varying the color of the light that is passed through the electronic display 12 from the image, or otherwise varying the characteristics of the light passing therethrough (e.g., by diffusing the image, or by providing a flare). The filtering may also include by emitting light from the electronic display 12 that is overlaid upon the image on the object side of the electronic display 12. The emitted light may vary the color or amount (intensity) of light that is received by the camera lens.

In an embodiment in which the light from the image that is transmitted through the electronic display 12 is reduced, the reduction in light may have various forms. For example, the reduction in light may be similar to a neutral density filter (ND filter), which may filter for all colors of the image substantially equally. The amount of filtering, however, may be varied electronically, thus allowing the electronic display to serve as an electronic variable neutral density filter. In an example, the reduction in light may be caused by liquid-crystals in the electronic display 12 not passing a desired amount of light through the electronic display 12. The light transmittance by the liquid-crystals can be varied electrically. The light transmittance may range from about 50% (similar to an 0.3ND filter), to about 25% (similar to a 0.6ND filter), to about 12.5% (similar to a 0.9ND filter), to about 6.25% (similar to a 1.2 ND filter), to about 3.125% (similar to a 1.5ND filter), to about 1.5625% (similar to a 1.8ND filter), to about 0.78125% (similar to a 2.1ND filter), and all transmittances above, below, and in between. In addition, in an embodiment in which a color filter is used with the electronic display 12, the color of the light passing through individual pixels of the electronic display 12 may be varied. The light transmittance (or density of the filtering) may be varied to any amount, electronically, as desired (e.g., 99%, 65%, etc.). The color of light passing through the electronic display 12 may be varied to any desired colors of the spectrum.

In an embodiment in which organic light emitting diodes (OLED) are utilized, the OLEDs may be set to emit light at a variety of brightness levels, and color levels in an embodiment in which color filtering is utilized. The electronic display 12 may filter the image by adding light from the OLEDs at a certain brightness and color (in an embodiment in which color filtering is utilized) to the light from the image. Light from the image may pass through the electronic display 12 and be modified by light added from the OLEDs. The modification may occur throughout the image (as shown in FIG. 1), or may occur on a pixel-by-pixel basis. In one embodiment, the OLEDs may be configured to emit a certain brightness of light, which may be reduced to effectively reduce the brightness of the image.

Figure 2:
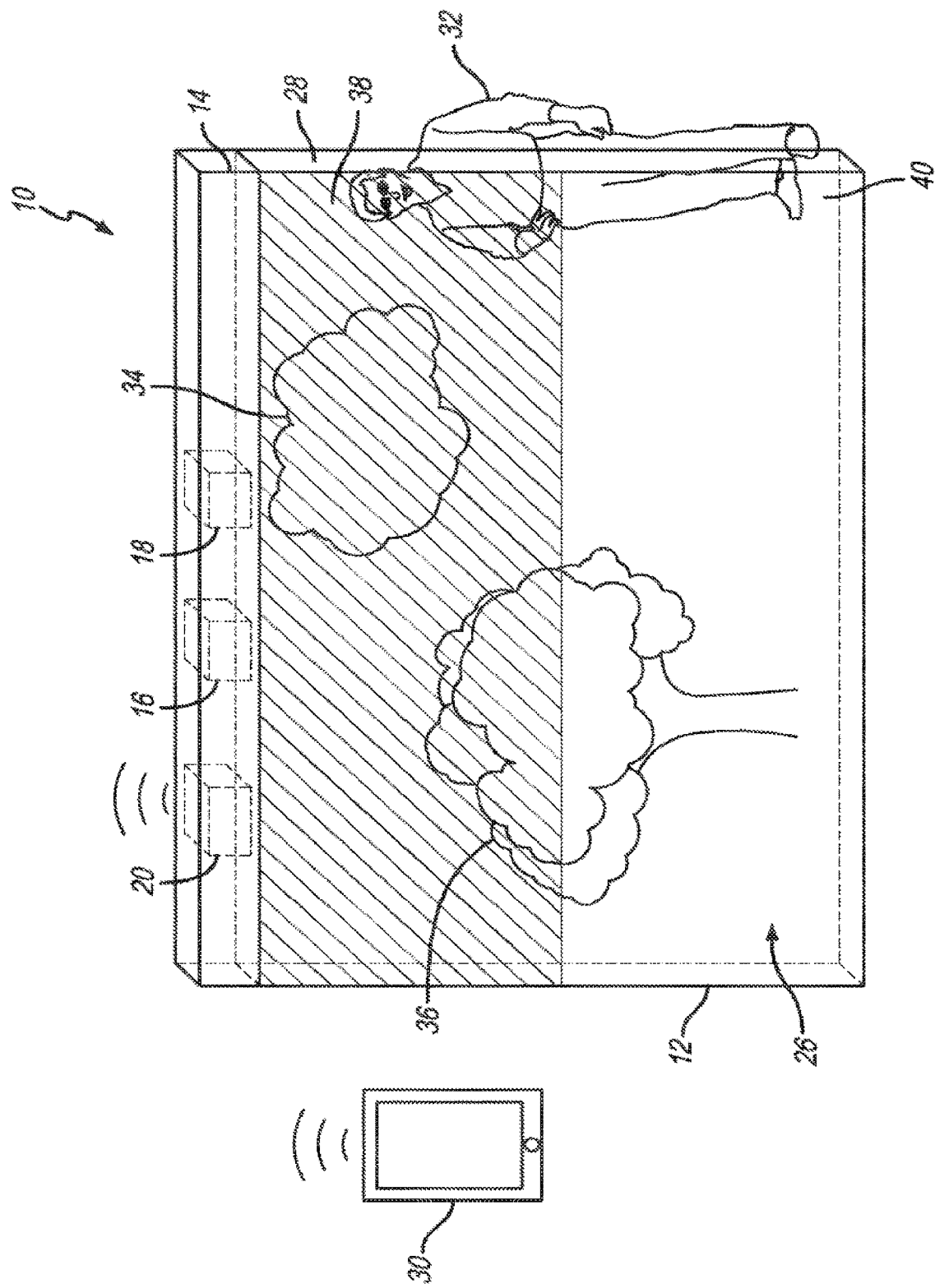
FIG. 2 illustrates a front view of the filter shown in FIG. 1, having different filtering than shown in FIG. 1.

Due to the electronic nature of the electronic display 12, one or more portions of the electronic display 12 may have varied filtering properties. The variation may occur on a pixel-by-pixel basis. FIG. 2, for example, illustrates the electronic display 12 having a portion 38 of the electronic display 12 with a filtered image, whereas another portion 40 of the display does not have a filtered image. The electronic display 12 accordingly operates as a graduated filter. The transition between the filtered portion and the non-filtered portion may be abrupt or may be smooth as desired.

Figure 3:
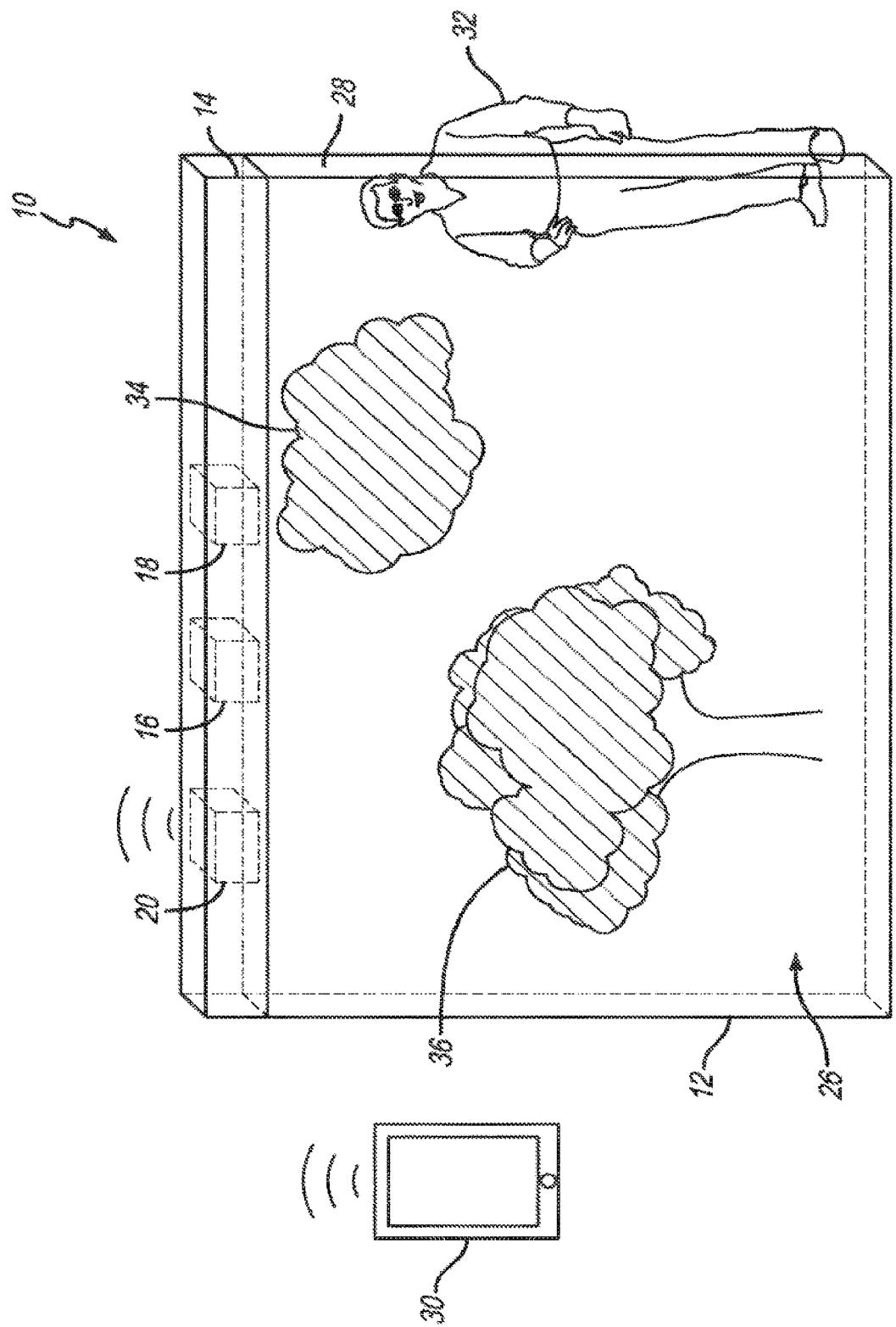
FIG. 3 illustrates a front view of the filter shown in FIG. 1, having different filtering than shown in FIG. 1.

FIG. 3 illustrates the electronic display 12 having selected portions filtered. In the example of FIG. 3, the top of the tree 36 and the cloud 34 are filtered, yet other portions are not filtered. A form of a "burn and dodge" effect may result.

The type and location of the filtering of the electronic display 12 may occur on a pixel-by-pixel basis. As shown in FIGS. 1-3, a variety of types and locations of filtering may be provided as desired. The variation in the filtering may occur based on a control provided to the input of the filter. The control may take a variety of forms, as disclosed herein.

The variation in the filtering of the electronic display 12 may occur dynamically. The type and location of the filtering may vary dynamically. A user, for example, could electronically control the electronic display 12 to rapidly shift the filtering of individual pixels such that a variety of filtering patterns result (e.g., dynamically shift from the filtering pattern shown in FIG. 1, to the pattern shown in FIG. 2, to the pattern shown in FIG. 3). A user may set any feature of the filtering via a control, which may be received from the control terminal 30 or the like. The filtering may be set on a pixel-by-pixel basis. For example, with the control interface shown in FIG. 4, the user could select individual pixels to have a desired filtering property.

The filtering may vary smoothly through density ranges. The filtering may be used to form a custom filter pattern. The filtering may be used in combination with a camera control. For example, an iris of the camera may vary, as well as the filtering, to bring a background object in or out of focus while a foreground object remains in focus (a form of iris filtering).

A benefit of the electronic display 12 is that typically non-electrical filters are used in camera systems and need to be manually swapped out of the camera systems. In addition, filters may not be swapped out during a shot. Further, if a camera is located on a crane that is elevated, the crane would need to be lowered for an individual to manually swap out the filter. The electronic display 12 allows for a variable filter that can be modified remotely. The filter can be varied dynamically, during a shot. A user need not physically touch the camera.

FIG. 6A illustrates an embodiment of a portion of the electronic display 12 in which liquid-crystal is utilized. The portion of the display 12 may include a front panel 42, and a rear panel 44, which may correspond to respective front and rear surfaces of the display 12. The panels 42, 44 may be made of optical glass. The display 12 may include polarized filter panels 46, 48 that are oriented orthogonal to each other. A control layer 50, which may comprise transistors and electrodes, may be utilized. Liquid-crystals 52 are utilized and may be divided into an array of pixels 22. In an embodiment in which color filtering is desired, a color filter 54 may be used. The color filter 54 may include red, green, and blue subpixels that combine to form a colored pixel. The light passing through the colored subpixels determines the color of the light passing through the electronic display 12. In accordance with principles of liquid-crystal display (LCD) technology, the voltage to the liquid crystals 52 may be varied to vary the orientation of the crystals. Varied amounts of light may be transmitted by the liquid crystals 52 based on the voltage to the crystals. In the electronic display 12, however, unlike standard LCD technology, there is no backlight. The image itself produces the light passed through the electronic display 12. In other embodiments, the electronic display 12 using the liquid crystals may have a different usage and structure than shown. For example, in one embodiment, a single pixel may be utilized (a 1×1 arrangement), and it may be utilized to vary the brightness of the image to a desired amount. In one embodiment, the order or presence of the internal layers 50, 52, 54 may vary depending on the desired structure of the electronic display 12. In one embodiment, the presence or structure of the polarized filter panels 46, 48 may be varied as desired.

FIG. 6B illustrates an embodiment of a portion of the electronic display 12 in which OLEDs are utilized. The portion of the display 12 may include a front panel 56, and a rear panel 58, which may correspond to respective front and rear surfaces of the display 12. The panels 56, 58 may be made of optical glass. The display 12 may include a cathode 60 and an anode 62. Electrical controls 64 may be provided in the form of a transistor matrix. Organic layers 66 may be provided that are divided into an array of pixels 24. In an embodiment in which color filtering is provided, the pixels 24 may be arranged into sub-pixels of an emitted color. As shown in FIG. 6B, three pixels 24 are shown, which may be a red, green, and blue pixel. The pixels 24 may be arranged into sub-pixels of an emitted color (such as a purple or orange emitted color). In other embodiments, color may not be provided by the OLEDs. The OLED panel may be transparent, and may allow light from the image to pass therethrough, that is modified by the light from the OLEDs. The configuration of the OLEDs may vary from the configuration shown in FIG. 6B. In one embodiment, the configuration may be an active matrix (AMOLED), or in other embodiments, may be passive (PMOLED). In one embodiment, a single OLED pixel (a 1×1 arrangement) may be provided.

The panels shown in FIGS. 6A to 6D may have a hard anti-reflective coating. The Ravg may be less than 0.2% @400-700 nm, with an angle of incidence at 15 degrees. The transmitted wavefront error may be preferably less than ½λ.

Figure 6D:
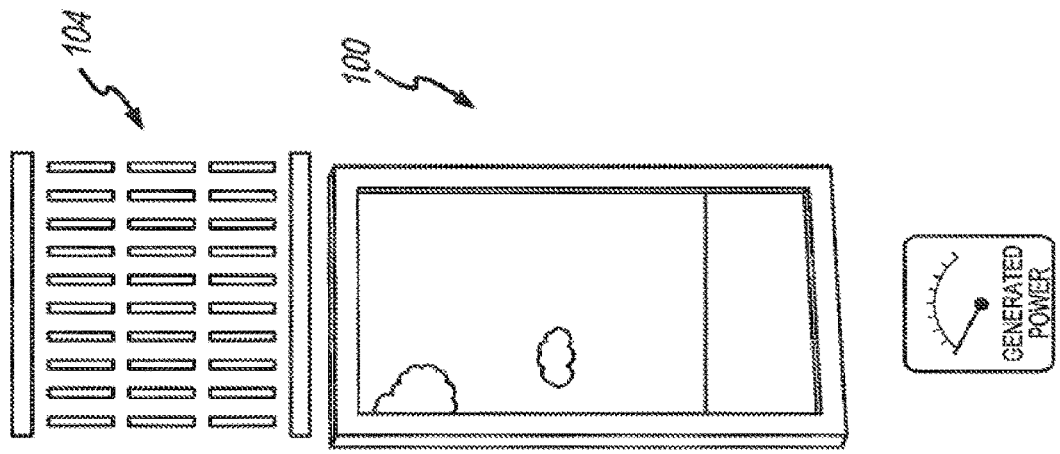
FIG. 6D illustrates the electronic display of FIG. 6C in which liquid-crystal is utilized, according to an embodiment of the present disclosure, wherein the liquid crystal is in a second state of operation.
Figure 6C:
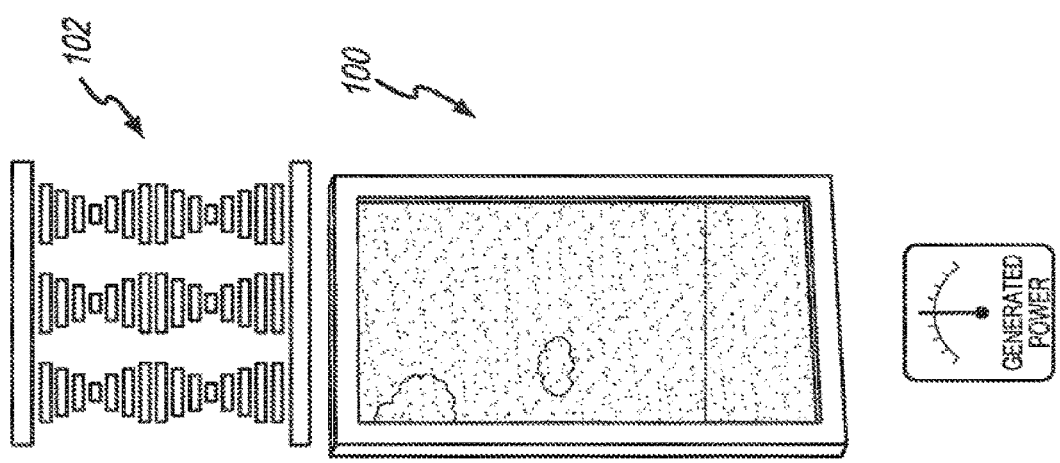
FIG. 6C illustrates a front view of an electronic display in which liquid-crystal is utilized, according to an embodiment of the present disclosure, wherein the liquid crystal is in one state of operation.

While the embodiment illustrated in FIG. 6A for use of liquid crystal shows a certain type of liquid crystal display architecture, it is to be understood that electronic devices utilizing liquid crystal for purposes of electronic displays as disclosed herein may have other types of architectures, wherein all such different architecture are within the scope of this disclosure. With reference to FIGS. 6C to 6E, an embodiment of an electronic display 100 in which liquid-crystal is utilized is illustrated having an architecture different from that illustrated in FIG. 6A. In this example, the liquid-crystal is provided in a guest-host liquid crystal architecture, comprising a liquid crystal cell filled with two materials; namely a dye material or "guest", and a liquid crystal material or "host. In an example, both the guest and host materials are shaped like rods inside of the cell. The transmission state of such electronic display can be controlled by different orientations of the liquid crystal layer.

The transmission of light through the electronic display is controlled by the liquid crystal guest-host dye layer. By applying different voltages over this layer, the orientation of the directors of the liquid crystal can be changed into different states. As the chemical structure of the dye molecules is similar to the liquid crystal molecules, the dye molecules will align themselves with the Liquid crystal directors. FIGS. 6C to 6D illustrate the electronic display 100 and provides a schematic representation of the director structure for two representative states. When unpolarized light is incident on the dye material, a polarization dependent absorption occurs. Introducing a twist in the liquid crystal guest-host dye layer, the orientation of the dyes will be different through the liquid crystal layer so the absorption becomes more polarization independent.

FIG. 6C illustrates the electronic display 100 in a first state where the liquid crystals directors are aligned 102 to reduce the transmission of light therethrough. FIG. 6D illustrates the electronic display 100 in a second state where the liquid crystal directors are aligned 104 to increase the transmission of light therethrough. The changes in the alignment of the liquid crystal directors are changed based on the electrical field that is applied to the electronic display.

In other embodiments, other forms of electronic displays may be used.

Figure 7A:
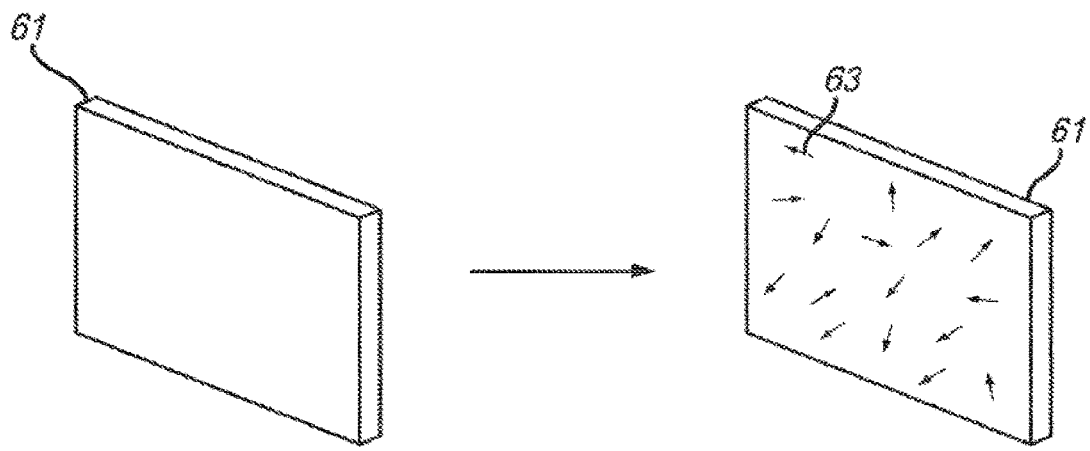
FIG. 7A illustrates a front perspective view of an electronic display performing filtering according to an embodiment of the present disclosure.

FIG. 7A illustrates an embodiment of an electronic panel 61 in which liquid-crystals 63 are utilized to filter the image by diffusing light. The liquid-crystals may be configured to randomly orient themselves upon a voltage or other form of energy being applied or removed from the liquid-crystals. Upon the orientation of the liquid-crystals being varied, a scattering of the light producing a diffusion of the light may result. The degree of diffusion may be varied by varying the amount of voltage or other form of energy being applied or removed from the liquid-crystals. The rightmost image of FIG. 7A illustrates the random orientation of the liquid-crystals.

Figure 7B:
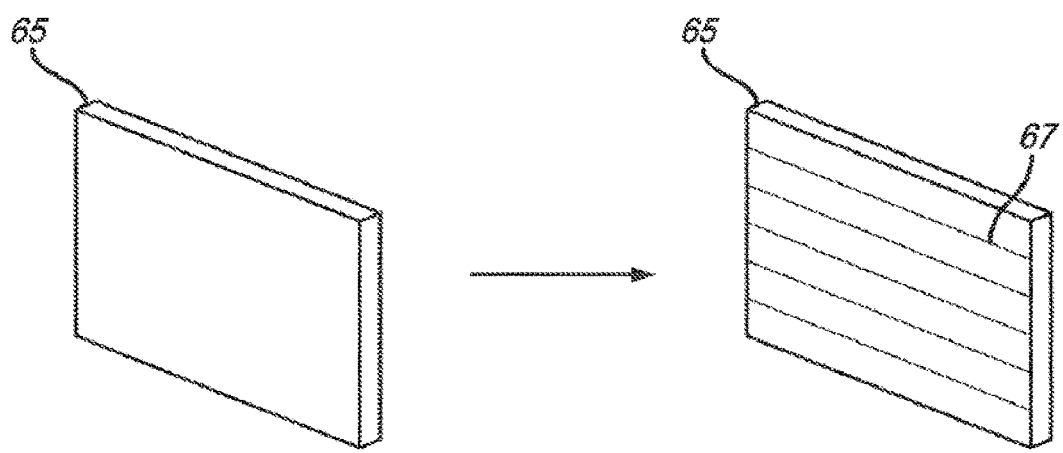
FIG. 7B illustrates a front perspective view of an electronic display performing filtering according to an embodiment of the present disclosure.

FIG. 7B illustrates an embodiment of an electronic panel 65 in which liquid-crystals 67 or particles (such as fiberglass shards) are utilized to filter the image by flaring the light. The liquid-crystals or other particles may be configured to orient themselves in a direction upon a voltage or other form of energy being applied or removed. For example, the liquid-crystals or other particles may be configured to orient themselves in a horizontal direction. Upon the orientation of the liquid crystals or particles being aligned horizontally, a horizontal flaring of the light passing through the panel 65 may occur, similar to the operation of a "streak" filter. In other embodiments, other directions of alignment and of flaring may be provided. For example, vertical flaring, or diagonal flaring may be provided, also similar to the operation of a "streak" filter. In one embodiment, the liquid-crystals or other particles may be configured to orient themselves radially, such that a radial flaring results. The degree of flaring may be varied by varying the amount of voltage or other form of energy being applied or removed from the liquid-crystals or particles, which will accordingly vary the orientation of the liquid-crystals or particles. The rightmost image of FIG. 7B illustrates a horizontal orientation of the liquid-crystals or particles, resulting in a horizontal flaring of the light (although other orientations may also be provided).

Figure 7C:
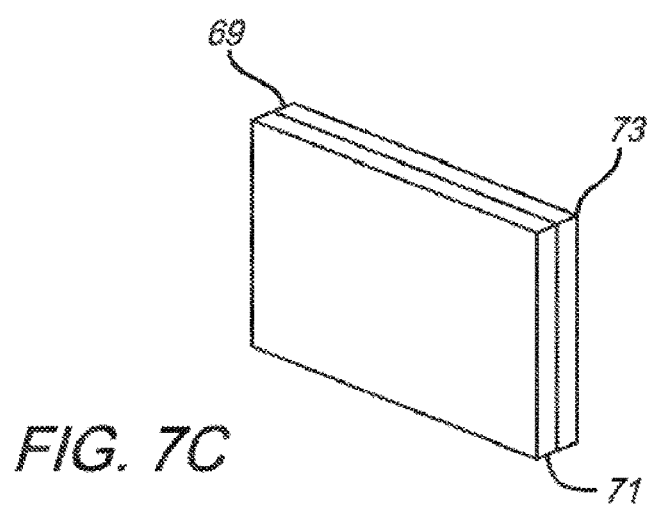
FIG. 7C illustrates a front perspective view of a panel of liquid-crystals utilized in combination with a panel of one or more organic light emitting diodes, according to an embodiment of the present disclosure.

In one embodiment, a combination of liquid crystals and OLEDs may be utilized. FIG. 7C illustrates a configuration of an electronic panel 69 in which an electronic panel 71 including one or more OLEDs is utilized in combination with an electronic panel 73 including liquid crystals. The panels 71, 73 may operate according to the methods disclosed herein for respective OLED panels and liquid-crystal panels. The panels 71, 73 may be configured in a stacked orientation in which light passes through both panels 71, 73. The electronic panel 73 accordingly may darken or lighten the image (or produce other optical effects disclosed herein), and the electronic panel 71 may add overlay light upon the resulting image to produce filtering.

The electronic panels disclosed herein may be controlled by the apparatuses, systems, and methods disclosed herein. A combination of panels and panel effects may be provided as desired.

Figure 8:
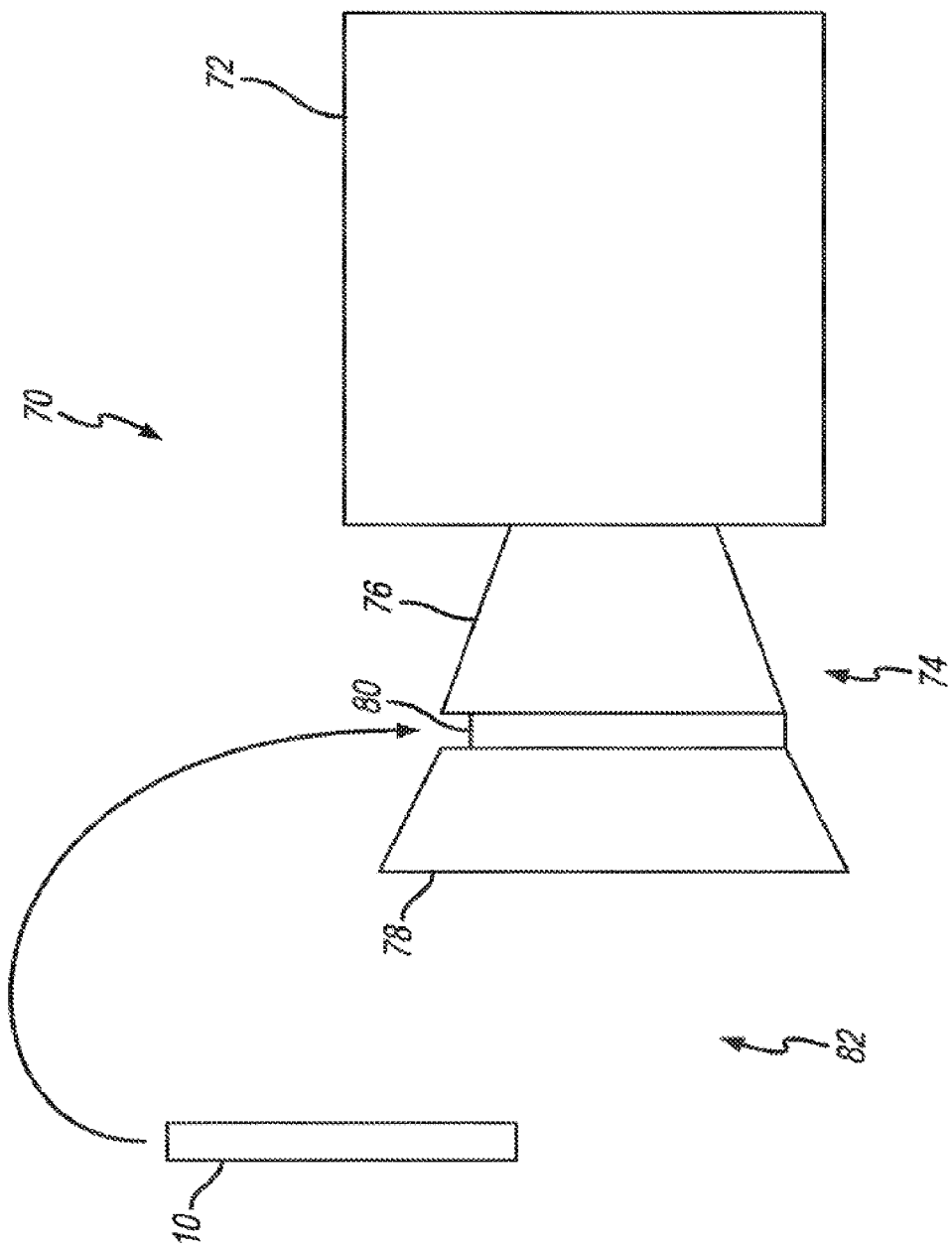
FIG. 8 illustrates a side view representation of a camera system, according to an embodiment of the present disclosure.

FIG. 8 illustrates a side view representation of a camera system 70. The camera system 70 may include a camera 72 and may include a lens system 74. The lens system 74 may include a camera lens 76 and may include a matte box 78. The matte box 78 may include a filter slot 80 for receiving the filter 10. The filter 10 may be positioned on the object side 82 of the camera lens 76 (as opposed to the image side, upon which the camera receives the image). The camera lens 76 may comprise one or more individual lens elements.

The filter 10 may be removably coupled to the matte box 78. The matte box 78 may be a conventional matte box for cinematographic cameras.

In other embodiments, other forms of coupling of the filter 10 to the lens system 74 or the camera system 70 may be utilized. For example, a screw-on, snap-on, or other form of mechanical connection may be provided for coupling.

Figure 9:
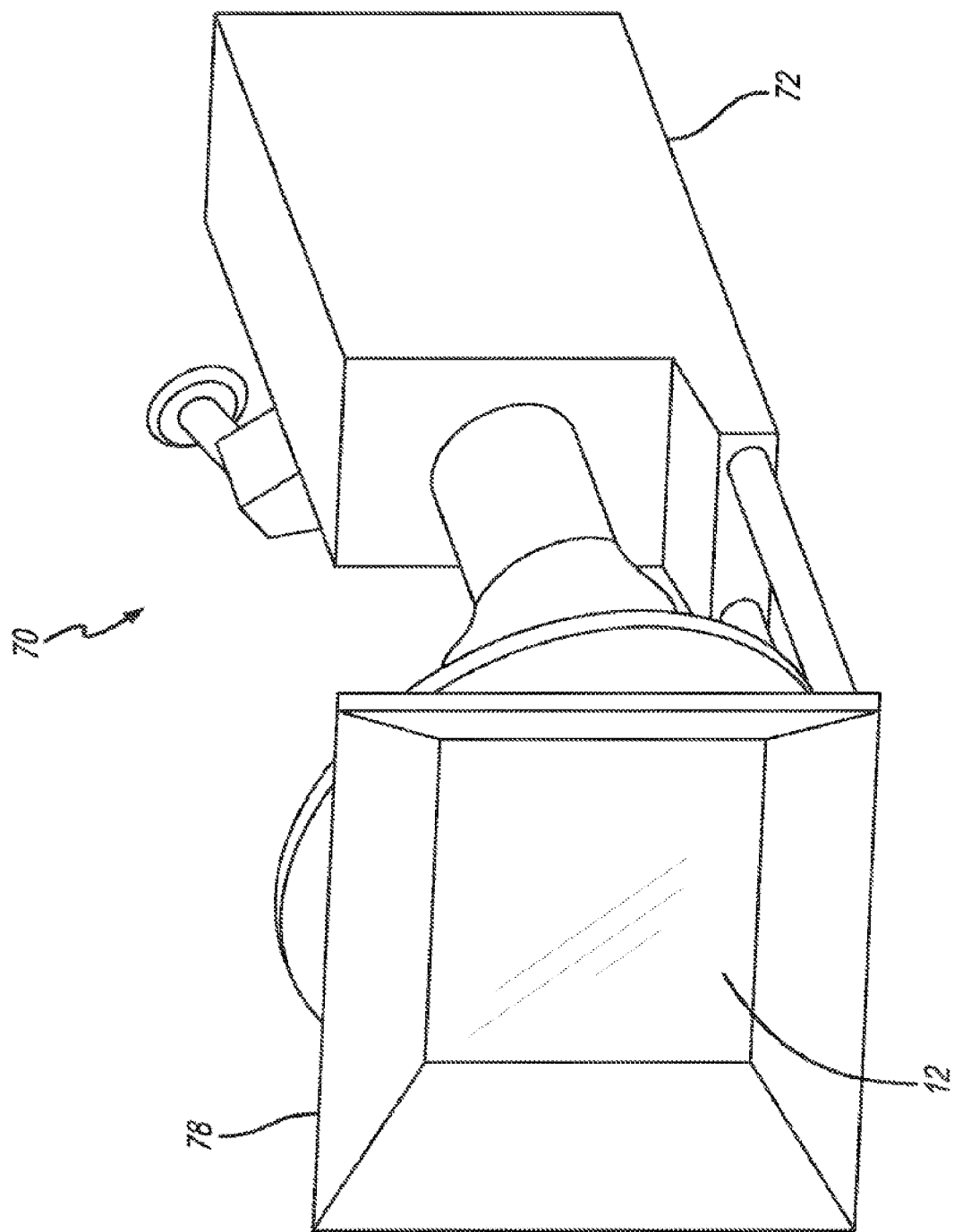
FIG. 9 illustrates a front perspective view of a camera system, according to an embodiment of the present disclosure.

FIG. 9 illustrates a front perspective view of the camera system 70. The filter 10 is installed in the matte box 78.

Figure 10:
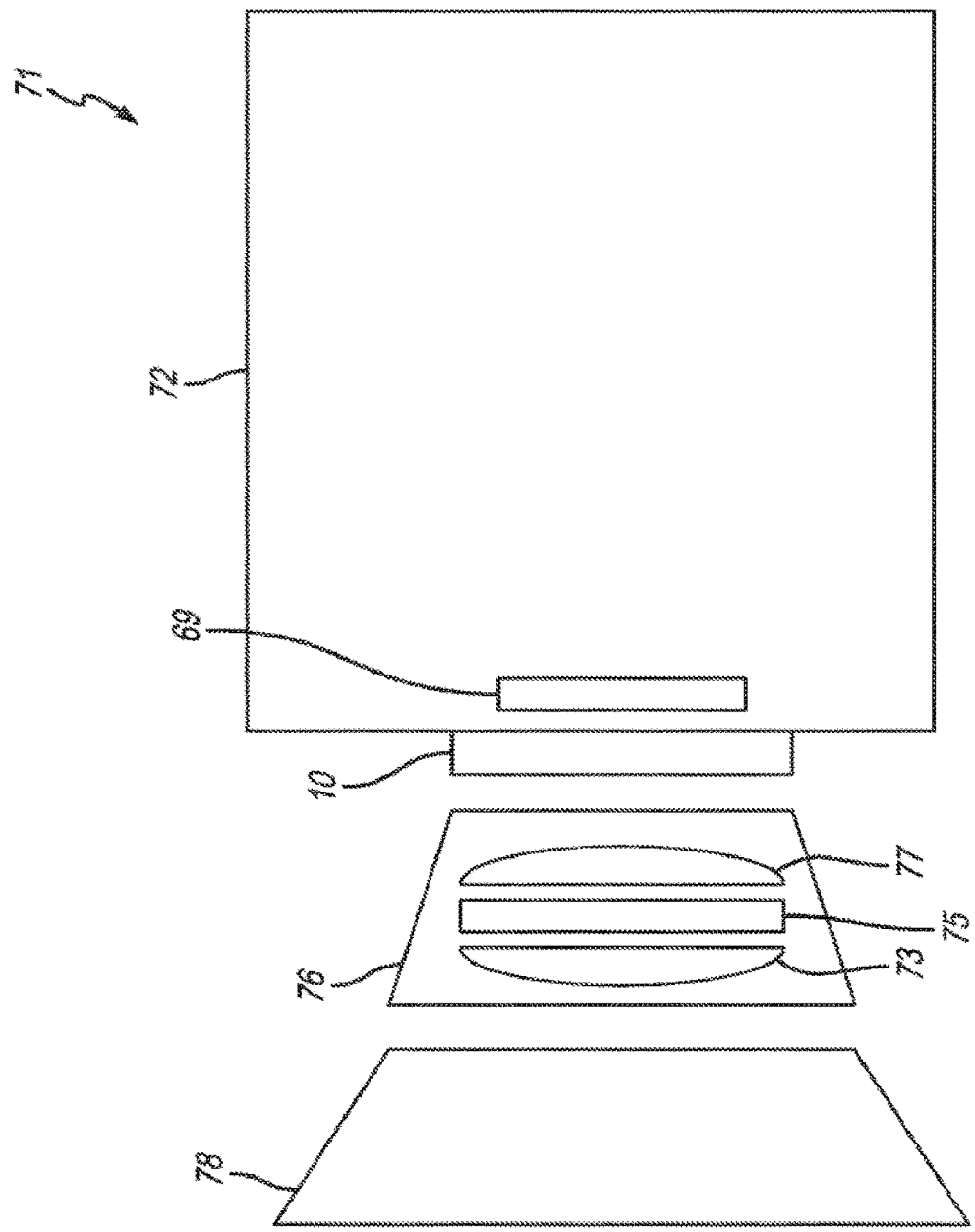
FIG. 10 illustrates a side view representation of a camera system, according to an embodiment of the present disclosure.

FIG. 10 illustrates an embodiment in which the filter 10 is positioned between the camera lens 76 and the image receiver 69 of the camera 72. The image receiver 69 may comprise a digital sensor or film for receiving the camera image, or other forms of image receivers. The filter 10 may be configured to provide the filtering disclosed herein, yet on the image side of the camera lens 76 and the object side of the image receiver 69. A plurality of lens elements 73, 75, are shown to comprise the lens 76. The filter 10 is positioned within the optical path of the camera system 71. In certain embodiments, the filter 10 may preferably include OLEDs for providing the OLED filtering disclosed herein. The filter 10 may be removably or permanently coupled to the camera system 71.

In embodiments herein, the camera 72 may be a camera for moving pictures (a film or digital camera), or may be a static image camera, e.g., a camera used for still photography. The camera may be used for cinematographic use (movie production), or may be used for non-cinematographic or commercial purposes. In one embodiment, the camera may be a mobile device (smart phone or other form of mobile device).

Figure 11:
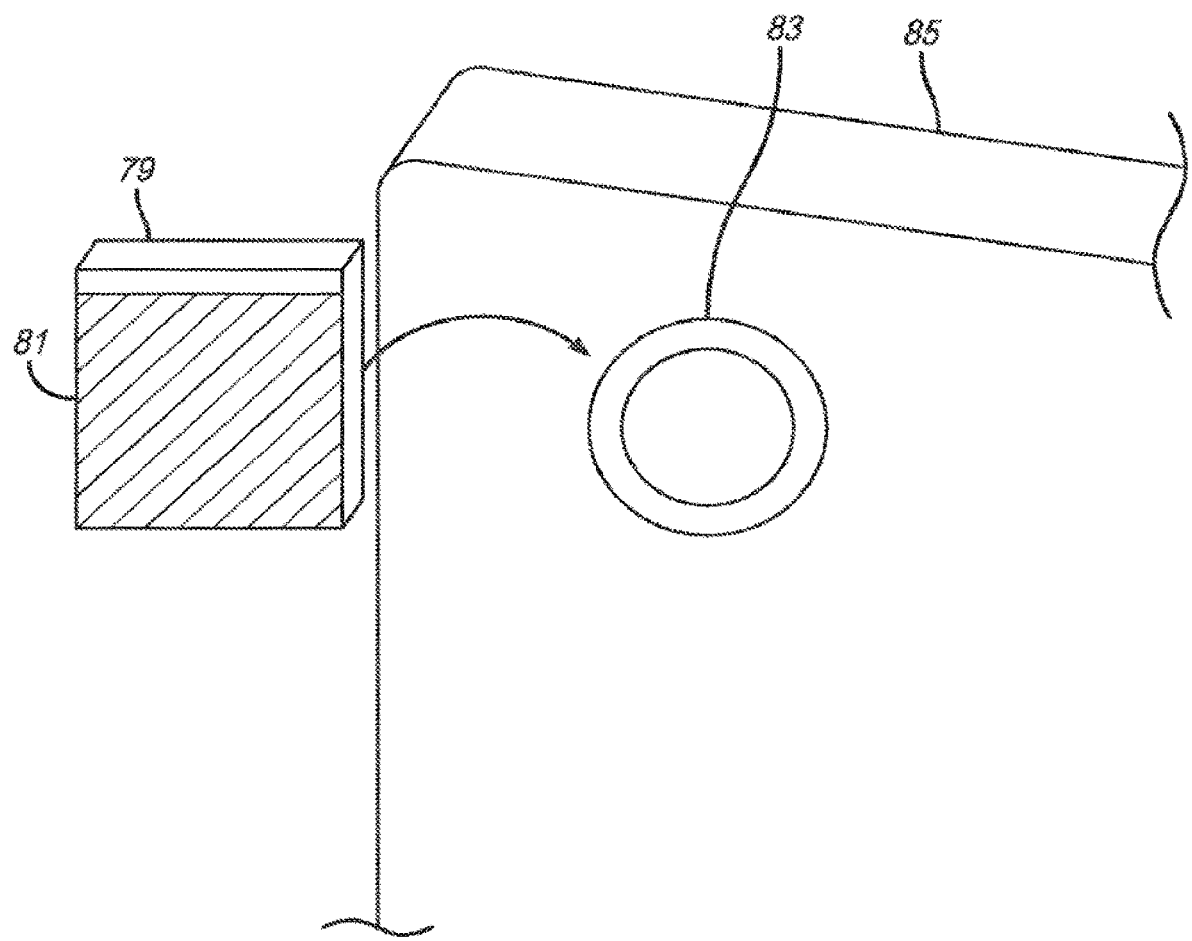
FIG. 11 illustrates a close-up view of an electronic display for use in combination with the camera of a mobile device, according to an embodiment of the present disclosure.

FIG. 11, for example, shows a filter 79 including an electronic display 81 according to embodiments disclosed herein. The filter 79 is to be coupled to the object side of a camera lens 83 of a mobile device's 85 camera. The filtering disclosed herein may be provided. The filter 79 may be removably coupled to the mobile device 85. The removable coupled may occur through an adhesive, a screw or snap fit, or other form of coupling. In one embodiment, the filter 79 may be positioned on the image side of the camera lens 83, and thus may be permanently coupled to the mobile device 85.

In one embodiment, the filters, electronic displays, and other apparatuses, systems, and methods, are not limited to use with a camera. The filters, electronic displays, and other apparatuses, systems, and methods may be used in other optical implementations, such as augmented reality viewers (including headsets, handsets, and the like) and virtual reality viewers (including headsets, handsets, and the like)

The disclosure is not limited to the apparatuses, and systems disclosed herein, but also extends to all methods of using, providing, or performing any of the apparatuses, and systems disclosed herein and their respective features.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A filter for use with a camera system comprising a camera and a camera lens, the filter comprising:
an electronic display configured for attachment with the camera system to filter an image passed through the electronic display to the camera, wherein the electronic display functions only as a neutral density filter to adjust an amount of light from an image received by the electronic display that is transmitted to the camera, wherein the electronic display comprises different neutral density filter level settings that are calibrated to at least one of different iris T-stop settings of the camera lens, different focus settings of the camera lens, different zoom settings of the camera lens, and different light exposure measurements of a light meter and stored in a memory within the electronic display;

a housing connected along one or more sides of the electronic display forming a combined assembly, wherein the combined electronic display and housing assembly has a planar configuration defined by opposed front and back electronic display and housing surfaces;

a controller disposed in the housing and configured to electrically control the filtering of the electronic display;

an input that is part of the housing for receiving a control signal from a remote device separate from the camera and configured to control one or more of the focus setting, zoom setting, T-stop setting, wherein the control signal controls the electronic display controller; and a user input that is part of the housing and configured to enable a user manual interaction therewith to provide a control signal for controlling the controller;

wherein the electronic display is configured to operate in synchrony with at least one of the camera lens iris, the camera lens focus, the camera lens zoom, and the light meter to provide a setting selected by the controller among the calibrated stored different neutral density filter level settings as a respective calibrated neutral density filter level setting change simultaneously based on at least one of different iris T-stop settings, different focus settings, different zoom settings, and different light exposure measurements.

2. The filter of claim 1, wherein the electronic display includes liquid-crystals therein for filtering the image.

3. The filter of claim 1, wherein the housing comprises at least a portion of a frame for the electronic display.

4. The filter of claim 1, wherein the electronic display is configured to removably couple to a matte box for coupling to the camera lens.

5. The filter of claim 4, wherein the electronic display neutral density filter level settings are calibrated to the camera lens iris T-stop settings, wherein the electronic display is synchronized to operate and simultaneously change filter settings with change of the camera lens iris T-stop settings, and wherein the camera lens iris is operated in synchrony with the camera lens focus.

6. The filter of claim 1, wherein the electronic display neutral density filter level settings are calibrated to the camera lens iris T-stop settings, and the electronic display operates in synchrony with the camera lens iris to simultaneously change the amount of filtering based on a change in the camera lens iris T-stop settings.

7. The filter of claim 1, wherein the electronic display neutral density filter level settings are calibrated to the camera lens focus settings, and wherein the electronic display operates in synchrony with the camera lens focus to simultaneously change the amount of filtering based on a change in the camera lens focus setting.

8. The filter of claim 1, wherein the electronic display neutral density filter level settings are calibrated to the light exposure measurements of the light meter, and wherein the electronic display operates in synchrony with the light meter to simultaneously change the amount of filtering based on a change in the light exposure measurements of the light meter.

9. The filter of claim 1, wherein the electronic display includes a first portion and a second portion, the first portion and second portion both configured to allow light to pass therethrough, and the controller is configured to electrically control the filtering of the electronic display such that the first portion filters the image at the same time the second portion does not filter the image.

10. The filter of claim 9, wherein the controller is configured to electrically control the filtering of the electronic display such that the second portion filters the image at the same time the first portion does not filter the image.

11. The filter of claim 1, wherein the input comprises a wireless signal receiver.

12. The filter of claim 1, wherein the input comprises a serial input port.

13. The filter of claim 1, wherein the filter is attached to an object side of the camera system.

14. A filter for a camera system, the filter comprising:

an electronic display configured to couple to a portion of the camera system in an optical path of the camera system and configured to filter an image passing through the electronic display for the camera system for image capture, wherein the electronic display only functions as a neutral density filter and comprises liquid crystals that are configured to enable the electronic display to provide different levels of neutral density filtering of light through the electronic display;

means for storing different programmed neutral density filter settings that are calibrated to at least one of different iris T-stop settings of a camera lens, different focus settings of a camera lens, different camera lens zoom settings, and different light exposure measurements of a light meter;

a housing that is attached to and frames the electronic display forming a combined assembly, wherein the combined assembly has a planar configuration defined by opposed front and back electronic display and housing surfaces, wherein the means for storing is disposed within the housing;

a controller disposed within the housing and configured to control the filtering of the electronic display;

means for receiving a control signal from a remoted device for controlling the controller;

a user input disposed in the housing and configured to enable user contact therewith to control the controller and adjust an amount of neutral density filtering;

wherein the electronic display is controlled to operate in synchrony with at least one of the camera lens iris, the camera lens focus, the camera lens zoom, and the light meter to simultaneously change the neutral density level provided by the electronic display to the calibrated setting selected by the controller among the stored calibrated different programmed neutral density filter settings based on a change to at least one of the iris T-stop settings, the focus settings, the zoom settings, and the light exposure measurements.

15. The filter of claim 14, wherein the filter is configured to couple to the camera system between a camera lens of the camera system and an image receiver of the camera system.

16. The filter of claim 14, wherein the filter is configured to couple to the camera system at an object side of a camera lens of the camera system.

17. The filter of claim 14, further comprising a processor configured to enable the filter to be programmed to assign different neutral density filter settings to at least one of the different iris T-stop settings, the different focus settings, the different zoom settings, and the different light exposure measurements to thereby provide the calibrated filter settings.

18. The filter of claim 14, wherein the calibrated neutral density filter settings are calibrated to the camera lens iris, and the electronic display operates in synchrony with the camera lens iris by use of the means for receiving to simultaneously provide the calibrated neutral density filter setting that corresponds to the different camera lens iris T-stop setting.

19. The filter of claim 14, wherein the calibrated neutral density filter settings are calibrated to the camera lens focus, and wherein the electronic display operates in synchrony with the camera lens focus by use of the means for receiving to simultaneously provide the calibrated neutral density filter setting that corresponds to the different camera lens focus setting.

20. The filter of claim 14, wherein the calibrated neutral density filter settings are calibrated to the camera lens iris, and wherein the electronic display operates in synchrony with the camera lens iris by use of the means for receiving to simultaneously provide the calibrated neutral density filter setting that corresponds to the different camera lens iris T-stop setting, and wherein the camera lens focus operates in synchrony with the camera lens iris.

21. The filter of claim 14, wherein the calibrated neutral density filter settings are calibrated to the light exposure measurements, and wherein the electronic display operates in synchrony with the light meter by use of the means for receiving to simultaneously provide the calibrated neutral density filter setting that corresponds to the different light exposure measurement.

22. A method of filtering an image for a camera system comprising a camera, a camera lens, and an electronic display device coupled to the camera system, the method comprising:
inputting neutral density filter settings into a memory within the electronic display device that are calibrated with at least one of different iris T-stop settings of the camera lens, different focus settings of the camera lens, different zoom settings of the camera lens, and different light exposure measurements of a light meter, wherein the electronic display device only functions as a neutral density filter, wherein the electronic display device comprises a housing that is attached thereto along one or more sides of the electronic display device forming a combined assembly, wherein a controller is disposed within the housing and configured operate the electronic display device based on the input neutral density settings; and
filtering with the electronic display device an amount of light transmitted to the camera, wherein during the step of filtering the electronic display device is operating in synchrony with at least one of the camera lens iris, the camera lens focus, the camera lens zoom, and the light meter, to simultaneously provide a setting selected by the controller among the input calibrated neutral density settings stored in the memory as a calibrated neutral density filter setting associated with the at least one respective different camera lens iris T-stop setting, different camera lens focus setting, different camera lens zoom setting, and the different light exposure measurement, and wherein a user-operated control device remote from the camera and the electronic display device is in communication with the electronic display device through a signal receiving means in the housing to provide a signal to the electronic display device that provides the calibrated neutral density filter setting during the step of filtering.

23. The method of claim 22, wherein the step of inputting comprises programming the at least one of the different iris T-stop settings, the different focus settings, the different zoom settings, and the different light exposure measurements with an associated electronic display neutral density filter setting to thereby develop the calibrated neutral density filter settings.

24. The method of claim 22, wherein the step of filtering is provided by liquid crystals in the electronic display device.

25. The method of claim 22, wherein the electronic display device operates in synchrony with the camera lens iris, and during the step of filtering the electronic display device simultaneously provides a neutral density filter setting that is calibrated with the different camera lens iris T-stop setting.

26. The method of claim 22, wherein the electronic display device operates in synchrony with the camera lens focus, and during the step of filtering the electronic display device simultaneously provides a neutral density filter setting that is calibrated with the different camera lens focus setting.

27. The method of claim 22, wherein the electronic display device operates in synchrony with the camera lens iris that operates in synchrony with the camera lens focus, and during the step of filtering the electronic display device simultaneously provides a neutral density filter setting that is calibrated with the different camera lens iris T-stop setting.

28. The method of claim 22, wherein the electronic display device operates in synchrony with the light meter, and during the step of filtering the electronic display device simultaneously provides a neutral density filter setting that is calibrated with the different light meter exposure measurement.

* * * * *